(12) United States Patent (10) Patent No.: US 10,634,532 B2
Kim et al. (45) Date of Patent: Apr. 28, 2020

(54) SYSTEM AND METHOD FOR OPTIMIZING DRIVING OF ULTRASONIC SENSOR

(71) Applicant: COAVIS, Sejong-si (KR)

(72) Inventors: Se Jin Kim, Sejong-si (KR); In Gon Kim, Sejong-si (KR); Jong Hyuk Yoon, Sejong-si (KR)

(73) Assignee: COAVIS, Sejong-si (KR)

( * ) Notice: Subject to any disclaimer, the term of this patent is extended or adjusted under 35 U.S.C. 154(b) by 282 days.

(21) Appl. No.: 15/810,601

(22) Filed: Nov. 13, 2017

(65) Prior Publication Data

US 2018/0136023 A1 May 17, 2018

(30) Foreign Application Priority Data

Nov. 15, 2016 (KR) .................. 10-2016-0151786

(51) Int. Cl.
*G01F 1/66* (2006.01)
*G01F 23/296* (2006.01)
*G01F 1/688* (2006.01)
*G01F 1/708* (2006.01)
*G01N 9/24* (2006.01)

(52) U.S. Cl.
CPC .............. *G01F 1/662* (2013.01); *G01F 1/667* (2013.01); *G01F 1/6882* (2013.01); *G01F 1/7082* (2013.01); *G01F 23/2962* (2013.01); *G01N 9/24* (2013.01); *G01N 2291/02836* (2013.01)

(58) Field of Classification Search
CPC ........ G01F 1/662; G01F 1/667; G01F 1/6882; G01F 1/7082
See application file for complete search history.

(56) References Cited

U.S. PATENT DOCUMENTS 6,925,869 B2 8/2005 Senibi et al.
7,542,870 B2 * 6/2009 Reimer ............... G01F 23/2962
702/155
2007/0203668 A1 * 8/2007 Reimer ............... G01F 23/2962
702/159

FOREIGN PATENT DOCUMENTS

JP 4522990 B2 8/2010
KR 19990058443 A 7/1999
KR 101452716 B1 10/2014

\* cited by examiner

*Primary Examiner* — Bryan Bui
(74) *Attorney, Agent, or Firm* — The Webb Law Firm

(57) ABSTRACT

Provided are a system and a method for optimizing driving of an ultrasonic sensor. The system for optimizing driving of an ultrasonic sensor includes: an ultrasonic sensor unit provided on an inner bottom surface of a fuel tank for a vehicle and obtaining a time of flight (TOF) for calculating a distance from the inner bottom surface of the fuel tank to a fuel surface; and a central processing unit calculating liquid level information of the fuel tank using the TOF transferred from the ultrasonic sensor unit and controlling a driving voltage of the ultrasonic sensor unit using the liquid level information.

9 Claims, 15 Drawing Sheets

Prior Art

FIG. 7 a) A PLURALITY OF TOFS

| 136 | 132 | 0 | 135 | 0 | 133 | 18 | 137 | b) ARRANGE AND CORRECT

| 137 | 136 | 135 | 133 | 132 | 18 | 0 | 0 | c) CALCULATE LIQUID LEVEL INFORMATION

| 137 | 136 | 135 | 133 | 132 | 18 |

AVERAGE VALUE d) REPEATEDLY PERFORM

INSERT NEW TOF → | 134 | 136 | 132 | 0 | 135 | 0 | 133 | 18 | → DELETE EXISTING TOF

SYSTEM AND METHOD FOR OPTIMIZING DRIVING OF ULTRASONIC SENSOR

CROSS-REFERENCE TO RELATED APPLICATION

This application claims priority to Korean Patent Application No. 10-2016-0151786 filed Nov. 15, 2016, the disclosure of which is hereby incorporated in its entirety by reference.

TECHNICAL FIELD

The following disclosure relates to a system and a method for optimizing driving of an ultrasonic sensor, and more particularly, to a system and a method for optimizing driving of an ultrasonic sensor capable of accurately measuring a liquid level in a fuel tank for a vehicle in a state in which a blind zone is minimized by controlling a driving state of the ultrasonic sensor in measuring the liquid level of the fuel tank for a vehicle using the ultrasonic sensor.

BACKGROUND

In the case of attaching and using an ultrasonic sensor to a bottom surface of a fuel tank for a vehicle in order to measure a level of a fuel in the fuel tank for a vehicle, the ultrasonic sensor is not exposed to the outside (air), such that an error of the ultrasonic sensor itself may be minimized, but it is difficult to measure a level of a fuel existing in a blind zone overlapping a ringing time generated at the time of driving the ultrasonic sensor.

In addition, in the case in which the fuel in the fuel tank for a vehicle reaches a temperature of a boiling point or more depending on an external environment, the fuel is boiled, such that bubbles are generated, as illustrated in FIG. 1.

In this case, when an ultrasonic signal for measuring a distance up to a fuel surface is transmitted using the ultrasonic sensor in order to measure a liquid level of the fuel in the fuel tank for a vehicle, a scattered reflection or scattering phenomenon due to the bubbles occurs.

In the case in which the scattered reflection or scattering phenomenon due to the bubbles occurs as illustrated in FIG. 1, the reflected ultrasonic signal may not be received, such that it is recognized that the fuel does not exist. Therefore, it is difficult to measure an accurate liquid level.

Korean Patent Laid-Open Publication No. 10-1999-0058443 (entitled "Fuel Amount Measuring Device and Method Using Ultrasonic Sensor" and referred to as Related Art Document 1) discloses a fuel amount measuring device and method capable of calculating a fuel amount remaining in a fuel tank by measuring a distance up to a fuel surface using an ultrasonic sensor installed on an inner wall of the fuel tank.

However, Related Art Document 1 does not mention a method for solving a problem that it is difficult to measure a level of a fuel existing in a blind zone overlapping a ringing time generated at the time of driving the ultrasonic sensor or a method for overcoming a measuring error of the ultrasonic sensor in the case in which the fuel is boiled, such that the bubbles are generated, which is the problem described above.

RELATED ART DOCUMENT

Patent Document (Patent Document 1) Korean Patent Laid-Open Publication No. 10-1999-0058443 (published on Jul. 15, 1999)

SUMMARY

An embodiment of the present invention is directed to providing a system and a method for optimizing driving of an ultrasonic sensor capable of accurately measuring a liquid level of a fuel tank for a vehicle in a state in which a blind zone is minimized by controlling a driving state of the ultrasonic sensor in order to solve a problem that it is difficult to measure a level of a fuel existing in a blind zone overlapping a ringing time generated at the time of driving the ultrasonic sensor, in measuring the liquid level of the fuel tank for a vehicle using the ultrasonic sensor.

In one general aspect, a system for optimizing driving of an ultrasonic sensor includes: an ultrasonic sensor unit 1000 provided on an inner bottom surface of a fuel tank for a vehicle and obtaining a time of flight (TOF) for calculating a distance from the inner bottom surface of the fuel tank to a fuel surface; and a central processing unit 2000 calculating liquid level information of the fuel tank using the TOF transferred from the ultrasonic sensor unit 1000 and controlling a driving voltage of the ultrasonic sensor unit 1000 using the liquid level information.

The central processing unit 2000 may control the driving voltage to be a minimum value of an allowable driving voltage of the ultrasonic sensor unit 1000 in the case in which the calculated liquid level information of the fuel tank is a preset minimum fuel amount value or less, and control the driving voltage to be a maximum value of the allowable driving voltage of the ultrasonic sensor unit 1000 in the case in which the calculated liquid level information of the fuel tank exceeds the preset minimum fuel amount value.

The central processing unit 2000 may forcibly control a pulse width of the ultrasonic sensor unit 1000 in the case in which the calculated liquid level information of the fuel tank exceeds the preset minimum fuel amount value, primarily forcibly control the number of pulses of the ultrasonic sensor unit 1000 in the case in which the calculated liquid level information of the fuel tank exceeds the preset minimum fuel amount value and is a preset maximum fuel amount value or less, and secondarily forcibly control the number of pulses of the ultrasonic sensor unit 1000 in the case in which the calculated liquid level information of the fuel tank exceeds the preset minimum fuel amount value and exceeds the preset maximum fuel amount value.

The system for optimizing driving of an ultrasonic sensor may further include a display unit 3000 outputting the liquid level information of the fuel tank transferred from the central processing unit 2000 so that a driver of the vehicle confirms the liquid level information.

In another general aspect, a method for optimizing driving of an ultrasonic sensor including an ultrasonic sensor unit provided on an inner bottom surface of the fuel tank, obtaining a TOF for calculating a distance from the inner bottom surface of the fuel tank to a fuel surface, and transmitting the TOF includes: a measuring step (S10) in which a central processing unit receives a plurality of TOFs transferred from the ultrasonic sensor unit by a preset number of times for a preset time; an arranging step (S20) in which the central processing unit calculates a plurality of initial liquid level information using the plurality of TOFs transferred in the measuring step (S10) and arranges the plurality of initial liquid level information in an ascending order or a descending order; a correcting step (S30) in which the central processing unit excludes initial liquid level information corresponding to a preset reference value or less or initial liquid level information corresponding to 0 among the plurality of initial liquid level information that is arranged in the arranging step (S20); a liquid level measuring step (S40) in which the central processing unit calculates final liquid level information using the initial liquid level information remaining after excluding the initial liquid level information in the correcting step (S30); and an ultrasonic driving control step (S50) in which the central processing unit controls a driving voltage of the ultrasonic sensor unit using the final liquid level information calculated in the liquid level measuring step (S40), wherein after the ultrasonic driving control step (S50) is performed, the measuring step (S10), the arranging step (S20), the correcting step (S30), the liquid level measuring step (S40), and the ultrasonic driving control step (S50) are repeatedly performed using the controlled driving voltage of the ultrasonic sensor unit.

In still another general aspect, a method for optimizing driving of an ultrasonic sensor including an ultrasonic sensor unit provided on an inner bottom surface of the fuel tank, obtaining a TOF for calculating a distance from the inner bottom surface of the fuel tank to a fuel surface, and transmitting the TOF includes: a measuring step (S100) in which a central processing unit receives a plurality of TOFs transferred from the ultrasonic sensor unit by a preset number of times for a preset time; a correcting step (S200) in which the central processing unit calculates a plurality of initial liquid level information using the plurality of TOFs transferred in the measuring step (S100) and excludes initial liquid level information corresponding to a preset reference value or less or initial liquid level information corresponding to 0 among the plurality of initial liquid level information; an arranging step (S300) in which the central processing unit arranges the initial liquid level information remaining after excluding the initial liquid level information in the correcting step (S200) in an ascending order or a descending order; a liquid level measuring step (S400) in which the central processing unit calculates final liquid level information using the initial liquid level information arranged in the arranging step (S300); and an ultrasonic driving control step (S500) in which the central processing unit controls a driving voltage of the ultrasonic sensor unit using the final liquid level information calculated in the liquid level measuring step (S400), wherein after the ultrasonic driving control step (S500) is performed, the measuring step (S100), the correcting step (S200), the arranging step (S300), the liquid level measuring step (S400), and the ultrasonic driving control step (S500) are repeatedly performed using the controlled driving voltage of the ultrasonic sensor unit.

The central processing unit may control the driving voltage to be a minimum value of an allowable driving voltage of the ultrasonic sensor unit in the case in which the calculated final liquid level information is a preset minimum fuel amount value or less, and control the driving voltage to be a maximum value of the allowable driving voltage of the ultrasonic sensor unit in the case in which the calculated final liquid level information exceeds the preset minimum fuel amount value.

The method for optimizing driving of an ultrasonic sensor may further include a displaying step of transferring the calculated final liquid level information to a display unit and displaying the calculated final liquid level information.

BRIEF DESCRIPTION OF THE DRAWINGS

FIG. 7 is an illustrative view illustrating processes of measuring a liquid level of the method for optimizing driving of an ultrasonic sensor according to the present invention.

DETAILED DESCRIPTION OF MAIN ELEMENTS

Figure 1:
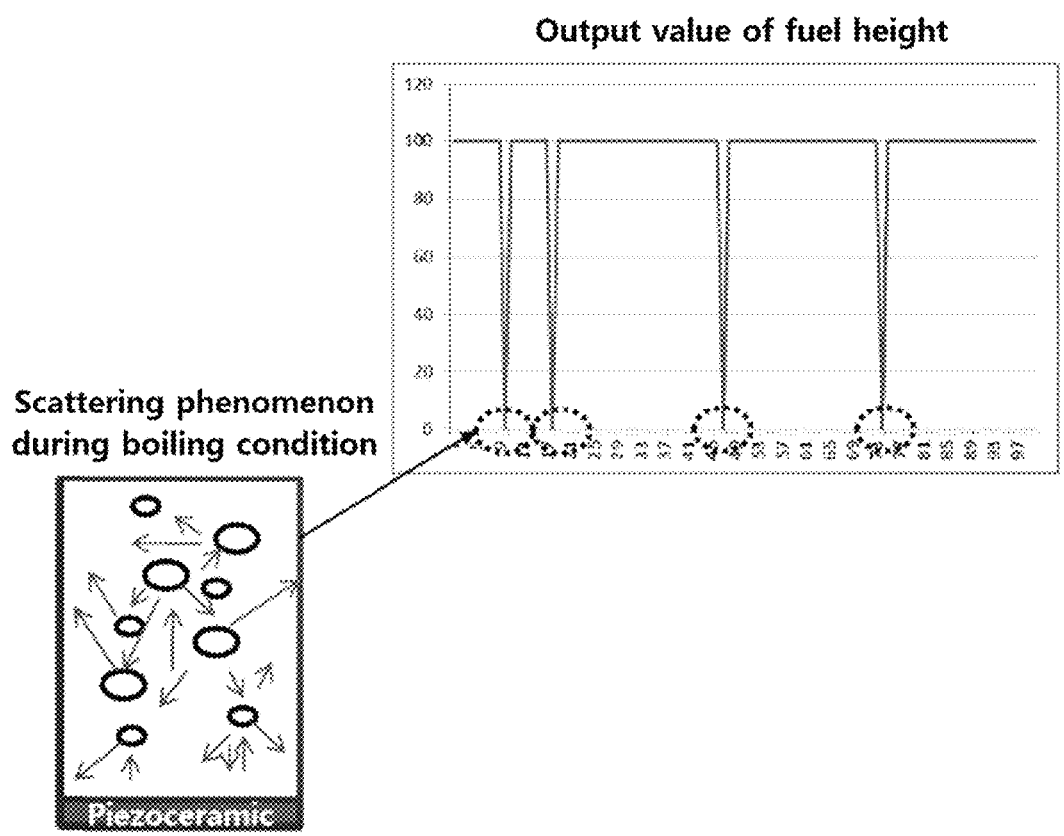
FIG. 1 is a view illustrating examples of bubbles generated in a fuel tank and a scattered reflection or scattering phenomenon of an ultrasonic signal due to the bubble and a graph illustrating a liquid level measuring error depending on the scattered reflection or scattering phenomenon.

1000: ultrasonic sensor unit
2000: central processing unit
3000: display unit

DETAILED DESCRIPTION OF EMBODIMENTS

Hereinafter, a system and a method for optimizing driving of an ultrasonic sensor according to an exemplary embodiment of the present invention will be described in detail with reference to the accompanying drawings. The drawings to be provided below are provided by way of example so that the spirit of the present invention can be sufficiently transferred to those skilled in the art. Therefore, the present invention is not limited to the drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

In addition, a system means a set of components including devices, mechanisms, means, and the like, systematized in order to perform required functions and regularly interacting with one another.

Further, each unit of the present specification may mean hardware capable of performing functions and operations according to the respective names described in the specification, or may mean an electronic recording medium, for example, a processor or a microprocessor, having computer program codes capable of performing specific functions and operations.

In other words, each unit of the present specification may mean a functional and/or structural combination of hardware for carrying out the technical idea of the present invention and/or software for driving the hardware.

The system and a method for optimizing driving of an ultrasonic sensor according to an exemplary embodiment of the present invention relate to a system and a method for optimizing driving of an ultrasonic sensor capable of accurately measuring a liquid level of a fuel tank for a vehicle in a state in which a blind zone is minimized by controlling a driving state of the ultrasonic sensor in order to solve a problem that it is difficult to measure a level of a fuel existing in a blind zone overlapping a ringing time generated at the time of driving the ultrasonic sensor, in measuring the liquid level of the fuel tank for a vehicle using the ultrasonic sensor.

Figure 3:
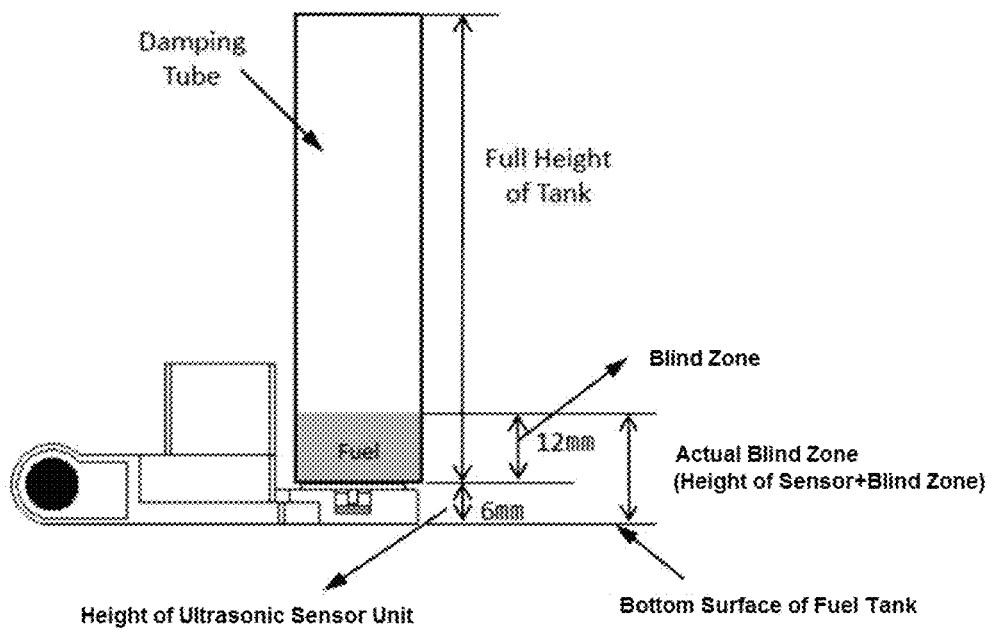
FIG. 3 is an illustrative view illustrating a configuration in which an ultrasonic sensor unit of the system for optimizing driving of an ultrasonic sensor according to an exemplary embodiment of the present invention is provided on an inner bottom surface of a fuel tank for a vehicle.

In detail, as illustrated in FIG. 3, an ultrasonic sensor unit is provided on a bottom surface of the fuel tank, and it is thus inevitable in a process and natural that it is impossible to measure a liquid level in the case in which a fuel amount is less than a height of the ultrasonic sensor itself, that is, in the case in which the liquid level is lower than the height of the ultrasonic sensor itself.

Figure 4:
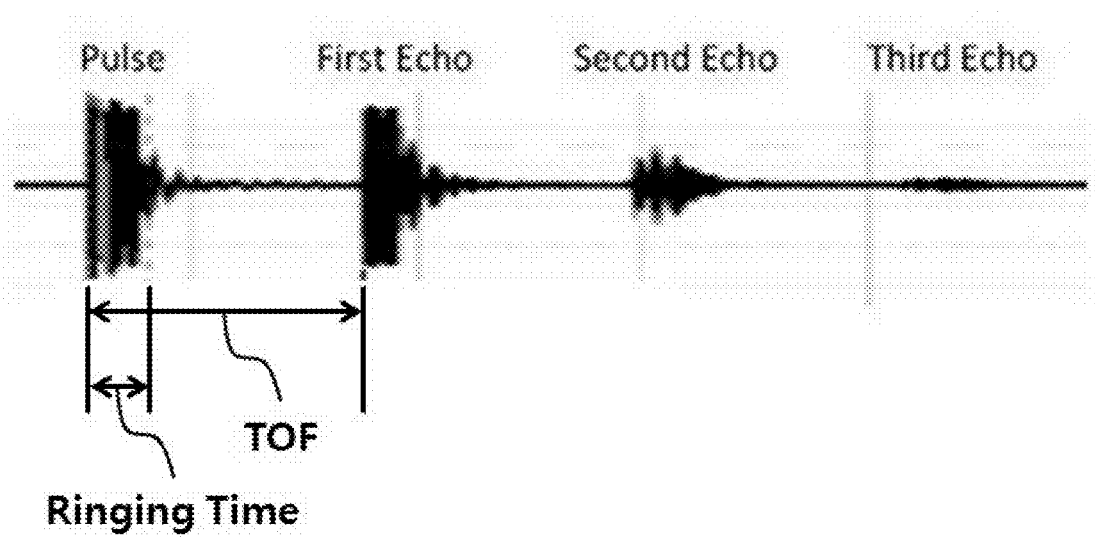
FIG. 4 is a graph illustrating an operating signal of the ultrasonic sensor unit of the system for optimizing driving of an ultrasonic sensor according to an exemplary embodiment of the present invention.

As illustrated in FIG. 4, a ringing time generated when the ultrasonic sensor transmits an initial ultrasonic signal appears in the ultrasonic sensor, and the ultrasonic sensor measures the liquid level using a time of flight (TOF), which is a signal unlit a reflected wave reflected on and returning from a fuel surface is received. Here, in a general case, the TOF is received behind the ringing time, and thus, there is no problem in measuring the liquid level. However, in the case in which a fuel amount in the fuel tank is very low, a case in which the reflected wave reflected on and returning from the fuel surface overlaps the ringing time occurs.

In this case, it is difficult to accurately decide whether or not a signal is a signal generated by the reflected wave or a signal generated by the ringing time, such that an unreliable section of a measured value appears, and this section means a blind zone of FIG. 3.

In the case of reducing strength of the ultrasonic signal in order to solve such a problem, the blind zone is reduced. However, the reduction in the blind region is possible only in the case of a low fuel amount in which the weak ultrasonic signal may sufficiently arrive at the fuel surface, and there is the possibility that the ultrasonic signal may not arrive at the fuel surface in the case of a high fuel amount. Therefore, such a manner is also unreliable.

Therefore, in the system and a method for optimizing driving of an ultrasonic sensor according to an exemplary embodiment of the present invention, a driving voltage of the ultrasonic sensor is controlled using liquid level information calculated in real time to minimize the blind zone, thereby making it possible to accurately measure the liquid level in the fuel tank regardless of a fuel amount.

Figure 2:
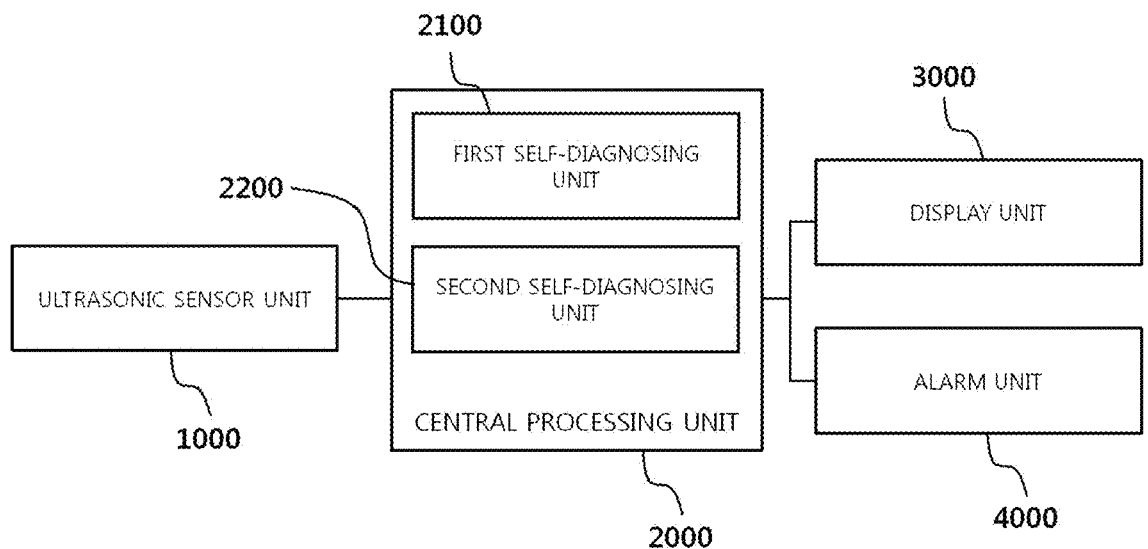
FIG. 2 is a schematic block diagram illustrating components of a system for optimizing driving of an ultrasonic sensor according to an exemplary embodiment of the present invention.

FIG. 2 is a schematic block diagram illustrating a system for optimizing driving of an ultrasonic sensor according to an exemplary embodiment of the present invention. The system for optimizing driving of an ultrasonic sensor according to an exemplary embodiment of the present invention will be described in detail with reference to FIG. 2.

The system for optimizing driving of an ultrasonic sensor according to an exemplary embodiment of the present invention may be configured to include an ultrasonic sensor unit 1000 and a central processing unit 2000, as illustrated in FIG. 2, and it is preferable that the ultrasonic sensor unit 1000 includes a reference sensor (not illustrated) and a measuring sensor (not illustrated).

In the reference sensor and the measuring sensor of the ultrasonic sensor unit 1000, an oscillating unit transmitting an ultrasonic signal and a responding unit receiving a reflected wave reflected and returning may be one component or be separate components.

In addition, it is preferable that the ultrasonic sensor unit 1000 is provided on an inner bottom surface of a fuel tank for a vehicle and is dipped in a fuel. In this way, an error of the ultrasonic sensor itself due to exposure to the air may be minimized.

The respective components will be described in detail. The ultrasonic sensor unit 1000, which is an ultrasonic level sensor, may be provided on the inner bottom surface of the fuel tank for a vehicle, as described above, measure a distance through transmission and reception of the ultrasonic signal on the inner bottom surface of the fuel tank, and transmit a TOF to the central processing unit 2000.

The reference sensor is a component for setting a reference for a transmission and reception speed of the ultrasonic signal since the transmission and reception speed of the ultrasonic signal is changed depending on a kind, a temperature, or the like, of fuel existing in the fuel tank.

The reference sensor may obtain a TOF reference by calculating a time required from after the ultrasonic signal is transmitted until a reflected signal reflected by a reflecting unit that is formed in advance returns. In this way, the reference sensor may set the reference for a transmission and reception speed of the ultrasonic signal depending on a fuel state in the fuel tank.

The measuring sensor may actually obtain a TOF surface level for calculating a liquid level of the fuel tank. The TOF surface level, which is data obtained by calculating a time required from after the ultrasonic signal is transmitted until the reflected signal reflected from to the fuel surface of the fuel tank returns, is calculated together with the TOF reference obtained from the reference sensor, such that a distance from the inner bottom surface of the fuel tank to the fuel surface may be calculated.

The central processing unit 2000 means a micro controller unit (MCU), which is a calculating means of a printed circuit board (PCB) provided in the vehicle, and liquid level information of the fuel tank calculated by the central processing unit 2000 may be transferred to a display unit 300 through controller area network (CAN) communication in the vehicle.

It is preferable that the display unit 3000 outputs the liquid level information of the fuel tank transferred from the central processing unit 2000 so as to be confirmed by a driver of the vehicle.

The central processing unit 2000 may calculate the liquid level information of the fuel tank using TOFs transferred from the ultrasonic sensor unit 1000 by a preset number of times for a preset time.

In addition, the central processing unit 2000 may control a driving voltage of the ultrasonic sensor unit 1000 using the calculated liquid level information of the fuel tank.

As described above, in the case in which the liquid level information of the fuel tank is a low fuel amount, the blind zone may be minimized by lowering driving strength of the ultrasonic sensor unit 1000.

In detail, it is preferable that the central processing unit 2000 controls the driving voltage to be a minimum value of an allowable driving voltage of the ultrasonic sensor unit 1000 in the case in which the calculated liquid level information of the fuel tank is a preset minimum fuel amount value or less and controls the driving voltage to be a maximum value of the allowable driving voltage of the ultrasonic sensor unit 1000 in the case in which the calculated liquid level information of the fuel tank exceeds the preset minimum fuel amount value.

In addition, the central processing unit 2000 may forcibly control a driving pulse width of the ultrasonic sensor unit 1000 while controlling the driving voltage to be the minimum value of the allowable driving voltage of the ultrasonic sensor unit 1000 in the case in which the calculated liquid level information of the fuel tank exceeds the preset minimum fuel amount value.

Here, the preset minimum fuel amount value is a value obtained by adding up a height of a general ultrasonic sensor itself and a height of a time in which the ringing time of the ultrasonic sensor is transferred, and is changed depending on a specification of the ultrasonic sensor, and a forcible control degree of the driving pulse width is changed depending on the specification of the ultrasonic sensor.

In addition, it is preferable that the central processing unit 2000 primarily forcibly controls the number of pulses of the ultrasonic sensor unit 1000 in the case in which the calculated liquid level information of the fuel tank exceeds the preset minimum fuel amount value and is a preset maximum fuel amount value or less, and secondarily forcibly controls the number of pulses of the ultrasonic sensor unit 1000 in the case in which the calculated liquid level information of the fuel tank exceeds the preset maximum fuel amount value.

Here, it is preferable that the preset maximum fuel amount value is differently set depending on a specification of the fuel tank, and the number of times of the forcible control of the number of pulses is also changed depending on the specification of the ultrasonic sensor.

As an example for the forcible control of driving of the ultrasonic sensor unit 1000 by the central processing unit 2000, in the case in which a minimum value of the driving voltage depending on the specification of the ultrasonic sensor is set to 7.5V, a maximum value of the driving voltage depending on the specification of the ultrasonic sensor is set to 26V, the minimum fuel amount value depending on the specification of the fuel tank is set to 50 mm, and the maximum fuel amount value depending on the specification of the fuel tank is set to 200 mm, arrangement as represented in the following Table 1 may be provided.

TABLE 1

| Liquid Level | Control of Driving of Ultrasonic Sensor | | |
|---|---|---|---|
| Information (x) in Fuel Tank | Driving Voltage | Pulse Width | Number of Pulses |
| X ≤ 50 mm | 7.5 V | 125 ns | 1 |
| x > 50 mm | 26 V | 250 ns | 1 |
| 50 mm < X ≤ 200 mm | 26 V | 250 ns | 4 |
| x > 200 mm | 26 V | 250 ns | 12 |

It is preferable that the above Table 1 is differently set depending on the specification of the fuel tank and the specification of the ultrasonic sensor, and the above Table 1 is only an example of the present invention.

The central processing unit 2000 may calculate the liquid level information of the fuel tank using the TOF reference transferred from the reference sensor and the TOF surface level transferred from the measuring sensor.

As illustrated in FIG. 4, the TOF of the ultrasonic sensor means a time required for a first reflected signal to return, and the liquid level information of the fuel tank may be calculated by substituting the TOF reference and the TOF surface level into the following Equation.

liquid level information=(reference distance)*(TOF reference/TOF surface level)

Here, the reference distance means a distance from the oscillating unit of the reference sensor to the reflecting unit that is formed in advance, and the liquid level information of the fuel tank may be calculated by obtaining the TOF reference for the reference distance that is already recognized, that is, the time required for the ultrasonic time to be reflected by and return from the reflecting unit, using the reference sensor to calculate a speed of the ultrasonic signal for the fuel (liquid) in the fuel tank and obtaining the TOF surface level, that is, the time required for the ultrasonic signal to be reflected by and return from the surface (the fuel surface) using the measuring sensor.

The central processing unit 2000 may calculate the liquid level information of the fuel tank using a plurality of TOF references and TOF surface levels that are transferred, by the preset number of times for the preset time, as described above.

In detail, the central processing unit 2000 may calculate a plurality of initial liquid level information using the plurality of TOF references and TOF surface levels.

The central processing unit 2000 arranges the plurality of initial liquid level information that is calculated, in an ascending order or a descending order.

Then, the central processing unit 2000 excludes initial liquid level information corresponding to a preset reference value or less or initial liquid level information corresponding to 0 among the plurality of initial liquid level information that is arranged.

In the case in which the number of initial liquid level information remaining after the exclusion of the initial liquid level information is an odd number, the central processing unit 2000 calculates liquid level information as the middle value, and in the case in which the number of initial liquid level information remaining after the exclusion of the initial liquid level information is an even number, the central processing unit 2000 calculates liquid level information as an average value of the middle two TOFs.

Here, the preset reference value is a data value larger than 0, and is preferably set to a value of a TOF that intends to be ignored among TOFs, which are distances from the inner bottom surface of the fuel tank to the fuel surface measured by the ultrasonic sensor unit 1000, and the preset reference value according to an exemplary embodiment of the present invention is set to only 0. This is only an example of the present invention, and may be controlled depending on performance of the ultrasonic sensor.

In addition, it is preferable that the central processing unit 2000 allows the driver of the vehicle to recognize the necessity to supply the fuel through a control of the display unit 3000 together with current liquid level information of the fuel tank in the case in which the calculated final liquid level information corresponds to a preset fuel supplying reference value or less.

In this case, the central processing unit 2000 of the system for optimizing driving of an ultrasonic sensor according to an exemplary embodiment of the present invention may not only calculate the liquid level information of the fuel tank and control the driving voltage of the ultrasonic sensor unit 1000, but may also predict an error state (for example, a short or an open) of the ultrasonic sensor unit 1000 to decide accuracy of the transferred TOF references and the TOF surface levels, and may further predict current conditions (generation of bubbles, an inclined condition, a state in which the fuel needs to be supplied, and the like) of the fuel tank to decide accuracy for the calculated liquid level information of the fuel tank.

Therefore, the display unit 3000 may not only output the liquid level information of the fuel tank transferred from the central processing unit 2000 so that the driver of the vehicle may recognize the liquid level information of the fuel tank, but also output the accuracy for the current liquid level information of the fuel tank for a vehicle to improve reliability.

The central processing unit 2000 may be configured to include a first self-diagnosing unit 2100 and a second self-diagnosing unit 2200.

The central processing unit 2000 may calculate the liquid level information of the fuel tank by performing a calculation process using the plurality of TOFs transferred from the ultrasonic sensor unit 1000 by the preset number of times for the preset time, as described above.

Here, it is preferable that the preset time is set to a time for continuously transferring information on a fuel amount remaining in the fuel tank for a vehicle to the driver of the vehicle, and the preset time according to an exemplary embodiment of the present invention is set to 100 ms. However, this is only an example of the present invention, and may be controlled.

In addition, it is preferable that the preset number of times is set to be within 10 in consideration of a speed and responsibility that may be processed in the ultrasonic level sensor configured in the ultrasonic sensor unit 1000, the preset number of times according to an exemplary embodiment of the present invention is 8, and a measuring time of one TOF is 12.5 ms in order to receive eight TOFs within 100 ms. The preset number of times within 10 is only an example of the present invention, and may be controlled depending on performance of the ultrasonic sensor.

The first self-diagnosing unit 2100 of the central processing unit 2000 may decide validity of the TOFs transferred from the ultrasonic sensor unit 1000, and the second self-diagnosing unit 2200 may decide validity of the calculated liquid level information of the fuel tank.

In detail, the first self-diagnosing unit 2100 may obtain a ringing time generated when the reference sensor transmits the ultrasonic signal and decide validity of TOF references of the reference sensor using the ringing time, and may obtain a ringing time generated when the measuring sensor transmits the ultrasonic signal and decide validity of TOF surface levels of the measuring sensor using the ringing time.

That is, as illustrated in FIG. 4, the ringing time is a pulse signal generated at the time of initial oscillation, and in the case in which a wave signal of the reference sensor or a wave signal of the measuring sensor is a preset threshold or more, the first self-diagnosing unit decides that the TOF references of the reference sensor or the TOF surface levels of the measuring sensor are valid.

In other words, in the case in which the wave signal is the preset threshold or less, the first self-diagnosing unit self-diagnoses that a defect exists in the reference sensor or the measuring sensor to decide that the TOF references transferred from the reference sensor in which the defect exists or the TOF surface levels transferred from the measuring sensor in which the defect exists are not accurate. In addition, the driver of the vehicle may recognize whether or not the liquid level information is accurate through a control of the display unit 3000.

The second self-diagnosing unit 2200 may decide the validity of the calculated liquid level information of the fuel tank calculated by the central processing unit 2000 using the TOF references transferred from the reference sensor and the TOF surface levels transferred from the measuring sensor.

In detail, in the case in which half or more of the plurality of initial liquid level information calculated using the plurality of TOF references and TOF surface levels are the preset reference value or less or 0, in other words, in the case in which the number of initial liquid level information excluded in the calculation process of the liquid level information is half or more of the number of initially calculated initial liquid level information, it is preferable that the second self-diagnosing unit 2200 decides that the calculated liquid level information of the fuel tank is invalid.

In addition, the driver of the vehicle may recognize whether or not the liquid level information is accurate through a control of the display unit 3000, similar to the first self-diagnosing unit 2100.

In addition, the system for optimizing driving of an ultrasonic sensor according to an exemplary embodiment of the present invention may be configured to further include an alarm unit 4000 outputting the liquid level information so that the driver of the vehicle may recognize inaccuracy of the liquid level information in the case in which the liquid level information is invalid as a self-diagnosis result of the central processing unit 2000, that is, a decision result for the validity of the TOFs or the liquid level information of the first self-diagnosing unit 2100 or the second self-diagnosing unit 2200.

The display unit 3000 outputs the liquid level information of the fuel tank calculated by the central processing unit 2000 regardless of the decision result of the first self-diagnosing unit 2100 or the second self-diagnosing unit 2200.

However, an operation of the alarm unit 4000 is controlled in order to inform the driver of the vehicle that that the liquid level information is inaccurate.

In detail, in the case in which the first self-diagnosing unit 2100 diagnoses that a defect exists in the TOF references of the reference sensor or the TOF surface levels of the measuring sensor to decide that the validity of the TOF references or the TOF surface levels are not valid, as described above, it is preferable that the alarm unit 4000 outputs an alarm so that the driver of the vehicle may recognize inaccuracy of the current liquid level information.

In addition, in the case in which the second self-diagnosing unit 2200 decides that the liquid level information of the fuel tank is invalid, it is preferable that the alarm unit 4000 outputs an alarm so that the driver of the vehicle may recognize inaccuracy of the current liquid level information.

Further, in the case in which the liquid level information of the fuel tank calculated by the central processing unit 2000 is a preset fuel supplying value or less, it is preferable that the display unit 3000 or the alarm unit 4000 outputs an alarm so that the driver of the vehicle may recognize the necessity to supply the fuel.

Figure 5:
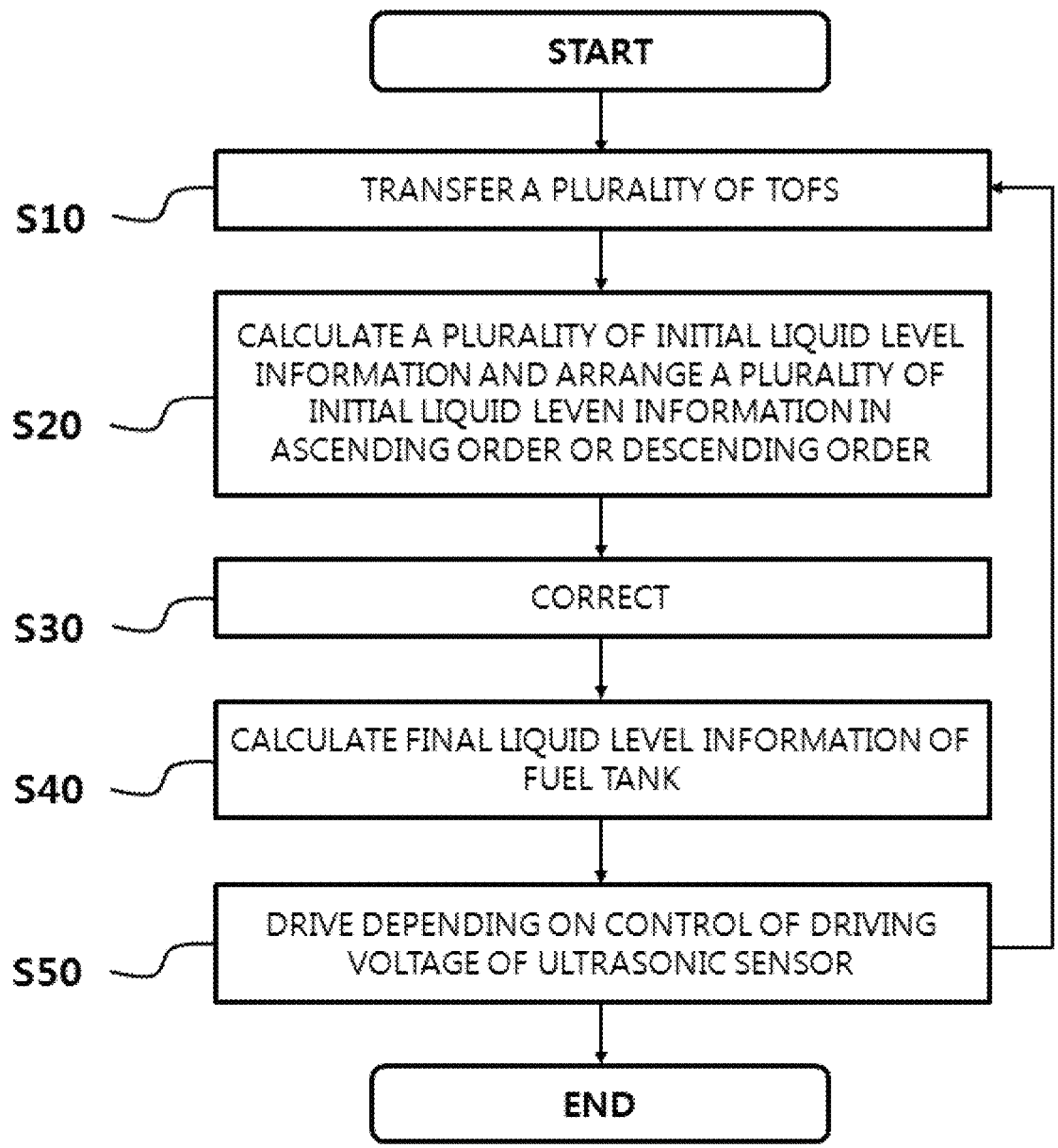
FIG. 5 is a flow chart illustrating a method for optimizing driving of an ultrasonic sensor according to an exemplary embodiment of the present invention.
Figure 6:
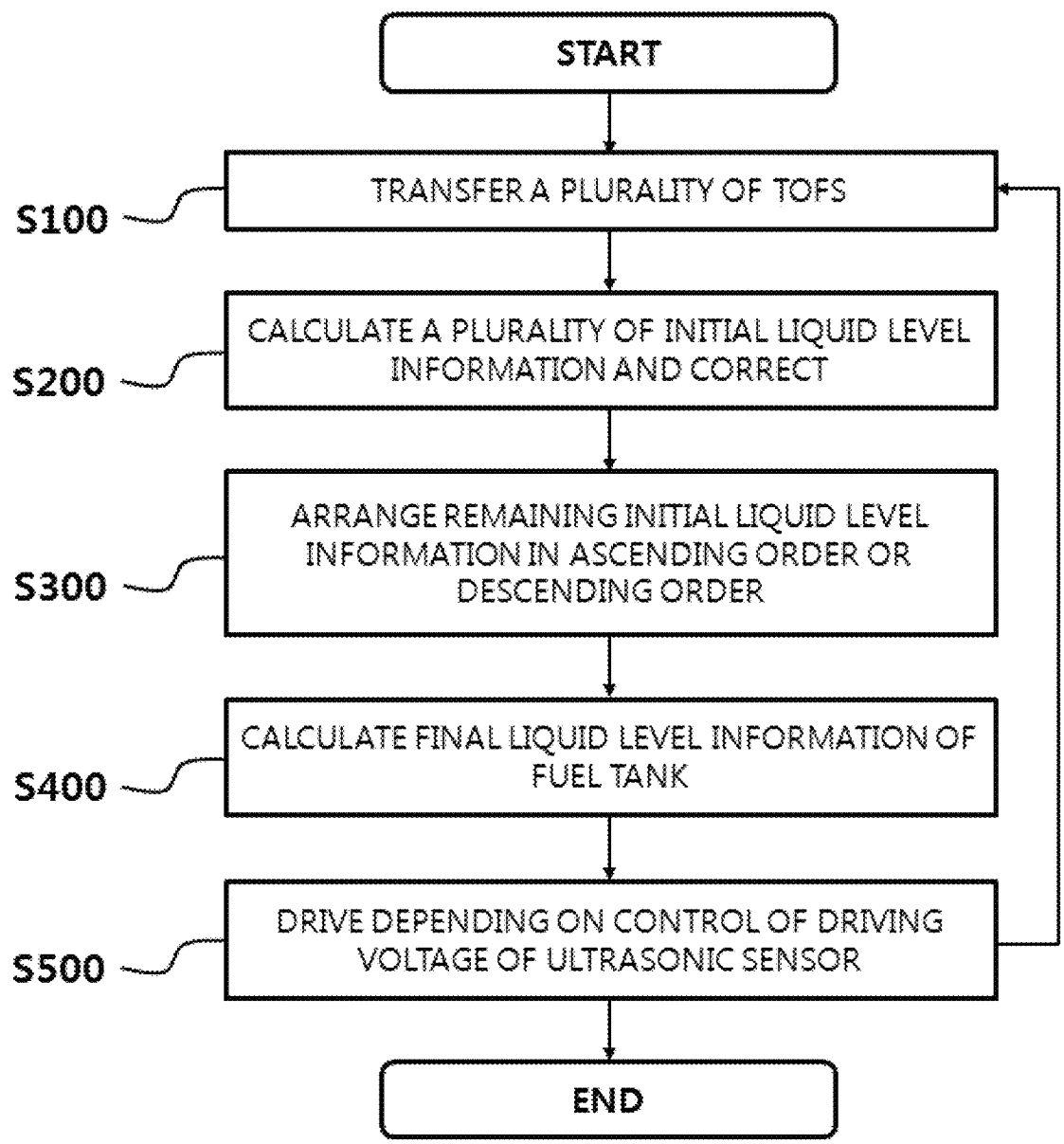
FIG. 6 is a flow chart illustrating a method for optimizing driving of an ultrasonic sensor according to another exemplary embodiment of the present invention.

FIGS. 5 and 6 are flow charts illustrating methods for optimizing driving of an ultrasonic sensor according to exemplary embodiments of the present invention. The methods for optimizing driving of an ultrasonic sensor according to exemplary embodiments of the present invention will be described in detail with reference to FIGS. 5 and 6.

First Exemplary Embodiment

The method for optimizing driving of an ultrasonic sensor according to an exemplary embodiment of the present invention may be configured to include a measuring step (S10), an arranging step (S20), a correcting step (S30), a liquid level measuring step (S40), and an ultrasonic driving control step (S50), as illustrated in FIG. 5.

The respective steps will be described in detail. In the measuring step (S10), the central processing unit 2000 may receive the plurality of TOFs transferred from the ultrasonic sensor unit 1000.

Here, the plurality of TOFs are the TOF references transferred from the reference sensor of the ultrasonic sensor unit 1000 and the TOF surface levels transferred from the measuring sensor of the ultrasonic sensor unit 1000 by the preset number of times for the preset time, as described above.

In the arranging step (S20), the central processing unit 2000 may calculate the plurality of initial liquid level information using the plurality of TOFs transferred in the measuring step (S10), and arrange the plurality of initial liquid level information in the ascending order or the descending order.

The initial liquid level information may be calculated by substituting the TOF reference transferred from the reference sensor and the TOF surface level transferred from the measuring sensor into the following Equation.

liquid level information=(reference distance)*(TOF reference/TOF surface level)

Here, the reference distance means a distance from the oscillating unit of the reference sensor to the reflecting unit that is formed in advance, and the liquid level information of the fuel tank may be calculated by obtaining the TOF reference for the reference distance that is already recognized, that is, the time required for the ultrasonic time to be reflected by and return from the reflecting unit, using the reference sensor to calculate a speed of the ultrasonic signal for the fuel (liquid) in the fuel tank and obtaining the TOF surface level, that is, the time required for the ultrasonic signal to be reflected by and return from the surface (the fuel surface) using the measuring sensor.

In the correcting step (S30), the central processing unit 2000 excludes the initial liquid level information corresponding to the preset reference value or less or the initial liquid level information corresponding to 0 among the plurality of initial liquid level information that is arranged in the ascending order or the descending order in the arranging step (S20).

In the liquid level measuring step (S40), the central processing unit 2000 calculates the final liquid level information of the fuel tank using a plurality of initial liquid level information remaining after the initial liquid level information corresponding to the preset reference value or less or the initial liquid level information corresponding to 0 is excluded among the plurality of initial liquid level information arranged in the correcting step (S30).

In detail, in the case in which the number of initial liquid level information remaining after the initial liquid level information corresponding to the preset reference value or less or the initial liquid level information corresponding to 0 is excluded among the plurality of initial liquid level information is an odd number, the central processing unit 2000 calculates the final liquid level information of the fuel tank as the middle value, and in the case in which the number of initial liquid level information remaining after the initial liquid level information corresponding to the preset reference value or less or the initial liquid level information corresponding to 0 is excluded among the plurality of initial liquid level information is an even number, the central processing unit 2000 calculates the final liquid level information of the fuel tank as the average value of the middle two TOFs.

For example, in the case in which the number of initial liquid level information that remains is five, the central processing unit 2000 calculates an initial liquid level information value arranged at a third position as the final liquid level information, and in the case in which the number of initial liquid level information that remains is four, the central processing unit 2000 calculates the final liquid level information as an average value of initial liquid level information values arranged at second and third positions.

In addition, it is preferable that the method for optimizing driving of an ultrasonic sensor according to an exemplary embodiment of the present invention further includes a displaying step performed after the liquid level measuring step (S40) is performed.

In the displaying step, the calculated liquid level information is transferred to the display unit 3000 to allow the driver of the vehicle to easily confirm (recognize) an amount currently remaining in the fuel tank.

In the ultrasonic driving control step (S50), the central processing unit 2000 may control the driving voltage of the ultrasonic sensor unit 1000 using the final liquid level information calculated in the liquid level measuring step (S40).

In detail, it is preferable that the central processing unit 2000 controls the driving voltage to be a minimum value of an allowable driving voltage of the ultrasonic sensor unit 1000 in the case in which the calculated liquid level information of the fuel tank is a preset minimum fuel amount value or less and controls the driving voltage to be a maximum value of the allowable driving voltage of the ultrasonic sensor unit 1000 in the case in which the calculated liquid level information of the fuel tank exceeds the preset minimum fuel amount value.

In addition, the central processing unit 2000 may forcibly control a driving pulse width of the ultrasonic sensor unit 1000 while controlling the driving voltage to be the minimum value of the allowable driving voltage of the ultrasonic sensor unit 1000 in the case in which the calculated liquid level information of the fuel tank exceeds the preset minimum fuel amount value.

Here, the preset minimum fuel amount value is a value obtained by adding up a height of a general ultrasonic sensor itself and a height of a time in which the ringing time of the ultrasonic sensor is transferred, and is changed depending on a specification of the ultrasonic sensor, and a forcible control degree of the driving pulse width is changed depending on the specification of the ultrasonic sensor.

In addition, it is preferable that the central processing unit 2000 primarily forcibly controls the number of pulses of the ultrasonic sensor unit 1000 in the case in which the calculated liquid level information of the fuel tank exceeds the preset minimum fuel amount value and is a preset maximum fuel amount value or less, and secondarily forcibly controls the number of pulses of the ultrasonic sensor unit 1000 in the case in which the calculated liquid level information of the fuel tank exceeds the preset maximum fuel amount value.

Here, it is preferable that the preset maximum fuel amount value is differently set depending on a specification of the fuel tank, and the number of times of the forcible control of the number of pulses is also changed depending on the specification of the ultrasonic sensor.

In the method for optimizing driving of an ultrasonic sensor according to an exemplary embodiment of the present invention, after the ultrasonic driving control step (S50) is performed, the measuring step (S10), the arranging step (S20), the correcting step (S30), the liquid level measuring step (S40), and the ultrasonic driving control step (S50) may be repeatedly performed using the driving voltage of the ultrasonic sensor unit 1000 controlled by the central processing unit 2000 to allow the driver of the vehicle to easily confirm an amount currently remaining in the fuel tank in real time.

Here, before these steps are repeatedly performed, the central processing unit 2000 removes first received one TOF of the plurality of TOFs transferred in the measuring step (S10), includes new one TOF in the plurality of TOFs to configure a plurality of TOFs of a new cycle, and then calculate liquid level information.

In more detail, as illustrated in FIG. 7, step a) of FIG. 7 is an illustrative view illustrating the plurality of initial liquid level information calculated using the TOF references transferred form the reference sensor of the ultrasonic sensor unit 1000 and the TOF surface levels transferred from the measuring sensor of the ultrasonic sensor unit 1000 by the preset number of times for the preset time by the central processing unit 2000.

Step b) of FIG. 7 is an illustrative view illustrating an example in which the plurality of initial liquid level information calculated by the central processing unit 2000 is arranged. As described above, two initial liquid level information corresponding to 0 is removed.

Step c) of FIG. 7 is an illustrative view illustrating an example in which in the case of excluding two initial liquid level information corresponding to 0, the number of initial liquid level information that remains is six, that is, an even number, and the final liquid level information of the fuel tank is thus calculated as the average value of the middle two initial liquid level information.

Step d) of FIG. 7 is an illustrative view illustrating an example of configuring a plurality of TOFs of a new cycle before calculating new liquid level information, in order to repeatedly calculate the liquid level information of the fuel tank. That is, the method for optimizing driving of an ultrasonic sensor is repeatedly performed by removing the first received one TOF and including the new one TOF.

In addition, the method for optimizing driving of an ultrasonic sensor according to an exemplary embodiment of the present invention may be configured to further include a self-diagnosing step of the ultrasonic sensor unit 1000.

In the self-diagnosing step, the first self-diagnosing unit 2100 of the central processing unit 2000 may receive the plurality of TOFs transferred in the measuring step (S10) to decide the validity of the TOFs transferred from the ultrasonic sensor unit 1000.

In detail, the first self-diagnosing unit 2100 of the central processing unit 2000 may obtain the ringing time generated when the reference sensor transmits the ultrasonic signal and decide the validity of the TOF references of the reference sensor using the ringing time, and may obtain the ringing time generated when the measuring sensor transmits the ultrasonic signal and decide the validity of TOF surface levels of the measuring sensor using the ringing time.

In the case in which the ringing time is the preset threshold or less, the first self-diagnosing unit self-diagnoses that a defect exists in the ultrasonic sensor unit 1000 itself to decide that the TOF references transferred from the reference sensor in which the defect exists or the TOF surface levels transferred from the measuring sensor in which the defect exists are not accurate.

However, in the method for optimizing driving of an ultrasonic sensor according to an exemplary embodiment of the present invention, it is preferable to calculate the liquid level information of the fuel tank and output the calculated liquid level information to the driver of the vehicle, regardless of a decision result of the self-diagnosing step.

In addition, the method for optimizing driving of an ultrasonic sensor according to an exemplary embodiment of the present invention may be configured to further include an additional self-diagnosing step of the ultrasonic sensor unit 1000.

In the additional self-diagnosing step, the second self-diagnosing unit 2200 of the central processing unit 2000 decides the validity of the final liquid level information calculated in the liquid level measuring step (S40) depending on the number of initial liquid level information that is excluded among the plurality of initial liquid level information in the correcting step (S30).

That is, it is preferable that the second self-diagnosing unit 2200 decides that the liquid level information of the fuel tank calculated by the central processing unit 2000 is invalid in the case in which the number of initial liquid level information excluded in the correcting step (S30) is half or more of the number of initially calculated initial liquid level information.

It is preferable to calculate the liquid level information of the fuel tank and output the calculated liquid level information to the driver of the vehicle, regardless of a decision result of the additional self-diagnosing step, similar to the self-diagnosing step.

However, it is preferable to control an operation state of the alarm unit 4000 so that the driver of the vehicle may recognize the inaccuracy of the liquid level information together with the calculated liquid level information of the fuel tank in the case in which it is decided in the self-diagnosing step that the TOFs of the ultrasonic sensor unit 1000 are not accurate, and it is preferable to control an operation state of the alarm unit 4000 so that the driver of the vehicle may recognize the inaccuracy of the liquid level information together with the calculated liquid level information of the fuel tank in the case in which it is decided in the additional self-diagnosing step that the final liquid level information calculated in the liquid level measuring step (S40) is not accurate.

Second Exemplary Embodiment

The method for optimizing driving of an ultrasonic sensor according to another exemplary embodiment of the present invention may be configured to include a measuring step (S100), a correcting step (S200), an arranging step (S300), a liquid level measuring step (S400), and an ultrasonic driving control step (S500), as illustrated in FIG. 6.

The respective steps will be described in detail. In the measuring step (S100), the central processing unit 2000 may receive the plurality of TOFs transferred from the ultrasonic sensor unit 1000.

Here, the plurality of TOFs are the TOF references transferred from the reference sensor of the ultrasonic sensor unit 1000 and the TOF surface levels transferred from the measuring sensor of the ultrasonic sensor unit 1000 by the preset number of times for the preset time, as described above.

In the correcting step (S200), the central processing unit 2000 calculates the plurality of initial liquid level information using the plurality of TOFs transferred in the measuring step (S100), and excludes the initial liquid level information corresponding to the preset reference value or less or the initial liquid level information corresponding to 0 among the plurality of initial liquid level information.

The initial liquid level information may be calculated by substituting the TOF reference transferred from the reference sensor and the TOF surface level transferred from the measuring sensor into the following Equation.

liquid level information=(reference distance)*(TOF reference/TOF surface level)

Here, the reference distance means a distance from the oscillating unit of the reference sensor to the reflecting unit that is formed in advance, and the liquid level information of the fuel tank may be calculated by obtaining the TOF reference for the reference distance that is already recognized, that is, the time required for the ultrasonic time to be reflected by and return from the reflecting unit, using the reference sensor to calculate a speed of the ultrasonic signal for the fuel (liquid) in the fuel tank and obtaining the TOF surface level, that is, the time required for the ultrasonic signal to be reflected by and return from the surface (the fuel surface) using the measuring sensor.

In the arranging step (S300), the central processing unit 2000 arranges the initial liquid level information remaining after excluding the initial liquid level information corresponding to the preset reference value or less or the initial liquid level information corresponding to 0 among the plurality of initial liquid level information in the correcting step (S200), in the ascending order or the descending order.

In the liquid level measuring step (S400), the central processing unit 2000 calculates the final liquid level information of the fuel tank using the plurality of initial liquid level information arranged in the arranging step (S300).

In detail, in the case in which the number of initial liquid level information remaining after the initial liquid level information corresponding to the preset reference value or less or the initial liquid level information corresponding to 0 is excluded among the plurality of initial liquid level information is an odd number, the central processing unit 2000 calculates the final liquid level information of the fuel tank as the middle value, and in the case in which the number of initial liquid level information remaining after the initial liquid level information corresponding to the preset reference value or less or the initial liquid level information corresponding to 0 is excluded among the plurality of initial liquid level information is an even number, the central processing unit 2000 calculates the final liquid level information of the fuel tank as the average value of the middle two TOFs.

In addition, it is preferable that the method for optimizing driving of an ultrasonic sensor according to another exemplary embodiment of the present invention further includes a displaying step performed after the liquid level measuring step (S400) is performed.

In the displaying step, the calculated liquid level information is transferred to the display unit 3000 to allow the driver of the vehicle to easily confirm (recognize) an amount currently remaining in the fuel tank.

In the ultrasonic driving control step (S500), the central processing unit 2000 may control the driving voltage of the ultrasonic sensor unit 1000 using the final liquid level information calculated in the liquid level measuring step (S400).

In detail, it is preferable that the central processing unit 2000 controls the driving voltage to be a minimum value of an allowable driving voltage of the ultrasonic sensor unit 1000 in the case in which the calculated liquid level information of the fuel tank is a preset minimum fuel amount value or less and controls the driving voltage to be a maximum value of the allowable driving voltage of the ultrasonic sensor unit 1000 in the case in which the calculated liquid level information of the fuel tank exceeds the preset minimum fuel amount value.

In addition, the central processing unit 2000 may forcibly control a driving pulse width of the ultrasonic sensor unit 1000 while controlling the driving voltage to be the minimum value of the allowable driving voltage of the ultrasonic sensor unit 1000 in the case in which the calculated liquid level information of the fuel tank exceeds the preset minimum fuel amount value.

Here, the preset minimum fuel amount value is a value obtained by adding up a height of a general ultrasonic sensor itself and a height of a time in which the ringing time of the ultrasonic sensor is transferred, and is changed depending on a specification of the ultrasonic sensor, and a forcible control degree of the driving pulse width is changed depending on the specification of the ultrasonic sensor.

In addition, it is preferable that the central processing unit 2000 primarily forcibly controls the number of pulses of the ultrasonic sensor unit 1000 in the case in which the calculated liquid level information of the fuel tank exceeds the preset minimum fuel amount value and is a preset maximum fuel amount value or less, and secondarily forcibly controls the number of pulses of the ultrasonic sensor unit 1000 in the case in which the calculated liquid level information of the fuel tank exceeds the preset maximum fuel amount value.

Here, it is preferable that the preset maximum fuel amount value is differently set depending on a specification of the fuel tank, and the number of times of the forcible control of the number of pulses is also changed depending on the specification of the ultrasonic sensor.

In the method for optimizing driving of an ultrasonic sensor according to another exemplary embodiment of the present invention, after the ultrasonic driving control step (S500) is performed, the measuring step (S100), the correcting step (S200), the arranging step (S300), the liquid level measuring step (S400), and the ultrasonic driving control step (S500) may be repeatedly performed using the driving voltage of the ultrasonic sensor unit 1000 controlled by the central processing unit 2000 to allow the driver of the vehicle to easily confirm an amount currently remaining in the fuel tank in real time.

Here, before these steps are repeatedly performed, the central processing unit 2000 removes first received one TOF of the plurality of TOFs transferred in the measuring step (S100), includes new one TOF in the plurality of TOFs to configure a plurality of TOFs of a new cycle, and then calculate liquid level information.

In addition, the method for optimizing driving of an ultrasonic sensor according to another exemplary embodiment of the present invention may be configured to further include a self-diagnosing step of the ultrasonic sensor unit 1000.

In the self-diagnosing step, the first self-diagnosing unit 2100 of the central processing unit 2000 may receive the plurality of TOFs transferred in the measuring step (S100) to decide the validity of the TOFs transferred from the ultrasonic sensor unit 1000.

In detail, the first self-diagnosing unit 2100 of the central processing unit 2000 may obtain the ringing time generated when the reference sensor transmits the ultrasonic signal and decide the validity of the TOF references of the reference sensor using the ringing time, and may obtain the ringing time generated when the measuring sensor transmits the ultrasonic signal and decide the validity of TOF surface levels of the measuring sensor using the ringing time.

In the case in which the ringing time is the preset threshold or less, the first self-diagnosing unit self-diagnoses that a defect exists in the ultrasonic sensor unit 1000 itself to decide that the TOF references transferred from the reference sensor in which the defect exists or the TOF surface levels transferred from the measuring sensor in which the defect exists are not accurate.

However, in the method for optimizing driving of an ultrasonic sensor according to another exemplary embodiment of the present invention, it is preferable to calculate the liquid level information of the fuel tank and output the calculated liquid level information to the driver of the vehicle, regardless of a decision result of the self-diagnosing step.

In addition, the method for optimizing driving of an ultrasonic sensor according to another exemplary embodiment of the present invention may be configured to further include an additional self-diagnosing step of the ultrasonic sensor unit 1000.

In the additional self-diagnosing step, the second self-diagnosing unit 2200 of the central processing unit 2000 decides the validity of the final liquid level information calculated in the liquid level measuring step (S400) depending on the number of initial liquid level information that is excluded among the plurality of initial liquid level information in the correcting step (S200).

That is, it is preferable that the second self-diagnosing unit 2200 decides that the liquid level information of the fuel tank calculated by the central processing unit 2000 is invalid in the case in which the number of initial liquid level information excluded in the correcting step (S200) is half or more of the number of initially calculated initial liquid level information.

It is preferable to calculate the liquid level information of the fuel tank and output the calculated liquid level information to the driver of the vehicle, regardless of a decision result of the additional self-diagnosing step, similar to the self-diagnosing step.

However, it is preferable to control an operation state of the alarm unit 4000 so that the driver of the vehicle may recognize the inaccuracy of the liquid level information together with the calculated liquid level information of the fuel tank in the case in which it is decided in the self-diagnosing step that the TOFs of the ultrasonic sensor unit 1000 are not accurate, and it is preferable to control an operation state of the alarm unit 4000 so that the driver of the vehicle may recognize the inaccuracy of the liquid level information together with the calculated liquid level information of the fuel tank in the case in which it is decided in the additional self-diagnosing step that the final liquid level information calculated in the liquid level measuring step (S400) is not accurate.

In other words, the system and a method for optimizing driving of an ultrasonic sensor according to an exemplary embodiment of the present invention relate to a system and a method for optimizing driving of an ultrasonic sensor capable of improving accuracy of measurement by minimizing the blind zone inevitably generated in the ultrasonic sensor, in measuring the liquid level of the fuel tank for a vehicle using the ultrasonic sensor.

The calculated liquid level information of the fuel tank for a vehicle is compared and decided depending on the preset reference value to control the driving state of the ultrasonic sensor, thereby making it possible to minimize the blind zone.

In more detail, in the system and a method for optimizing driving of an ultrasonic sensor according to an exemplary embodiment of the present invention, the liquid level is measured using the ultrasonic sensor provided in the fuel tank for a vehicle, and it is most preferable that the fuel tank for a vehicle is configured as follows.

Figure 8A:
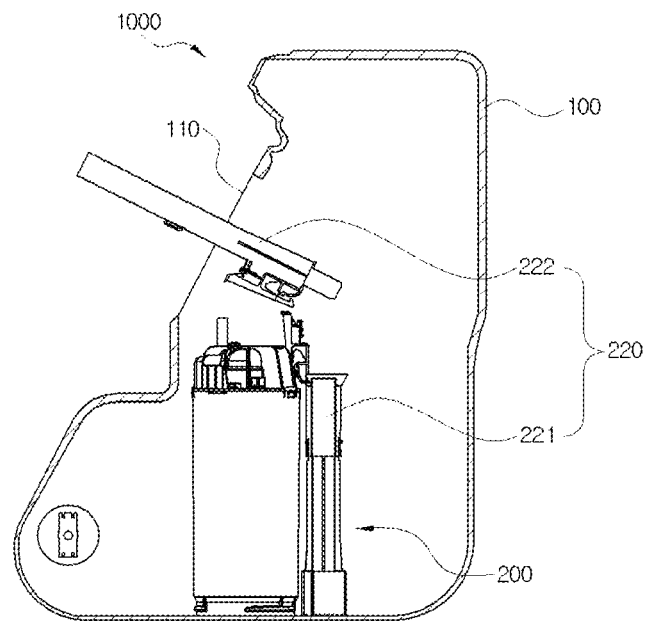
FIGS. 8(a) and 8(b) are views illustrating a fuel tank for a vehicle according to the present invention.
Figure 8B:
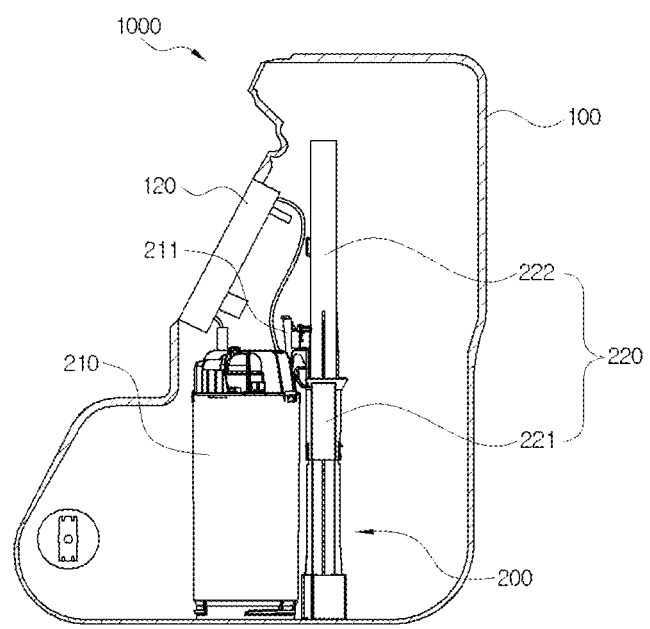
Figure 9:
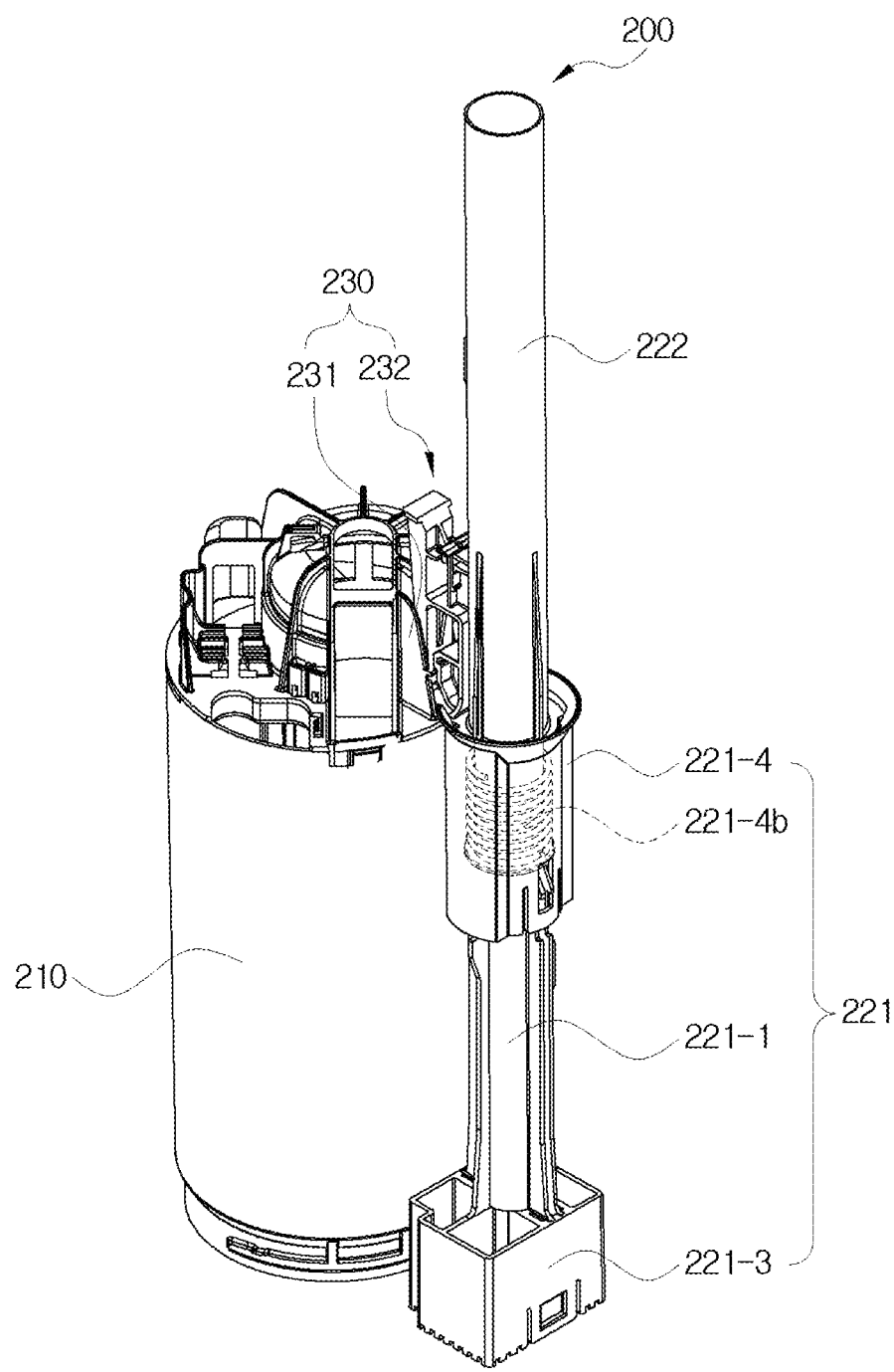
FIG. 9 is a view illustrating a fuel supply unit according to the present invention.
Figure 10:
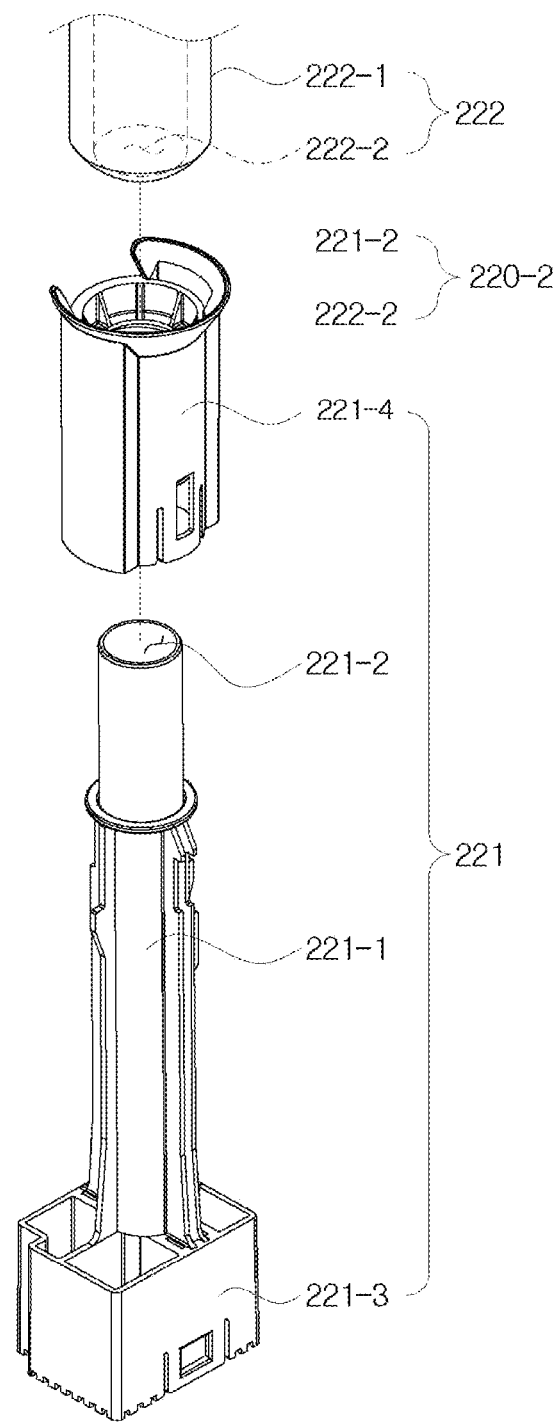
FIG. 10 is a view illustrating a first fuel measuring bar constituting a fule supplying unit of a fuel tank for a vehicle according to the present invention.
Figure 11:
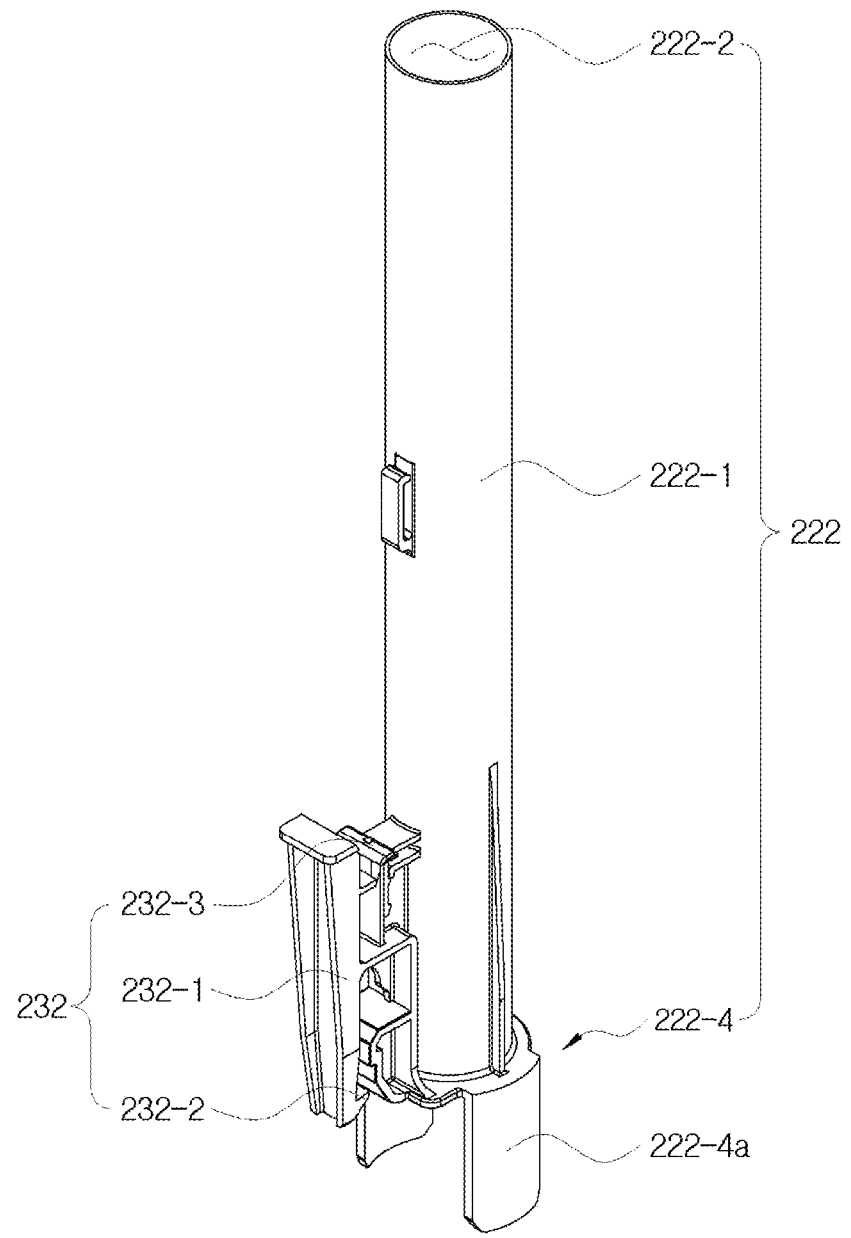
FIG. 11 is a view illustrating a second fuel measuring bar constituting a fule supplying unit of a fuel tank for a vehicle according to the present invention.
Figure 12:
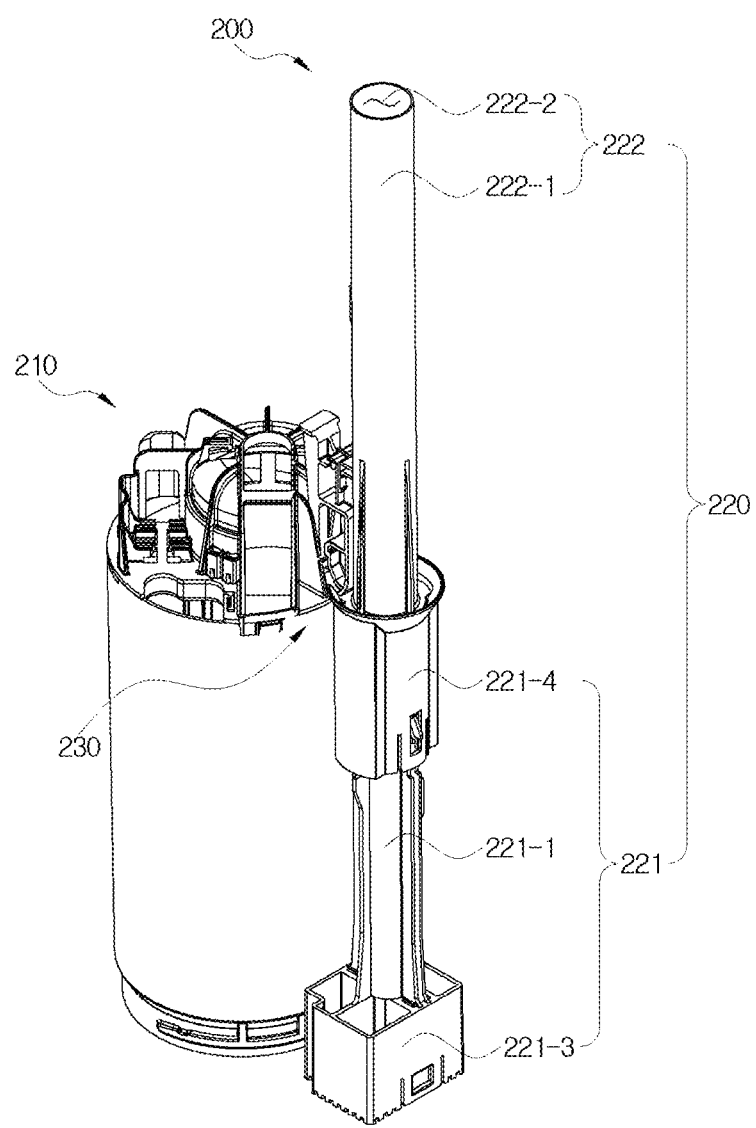
FIG. 12 is a view illustrating a fixing portion of a fuel measuring bar constituting a fuel supplying unit of a fuel tank for a vehicle according to the present invention.
Figure 13A:
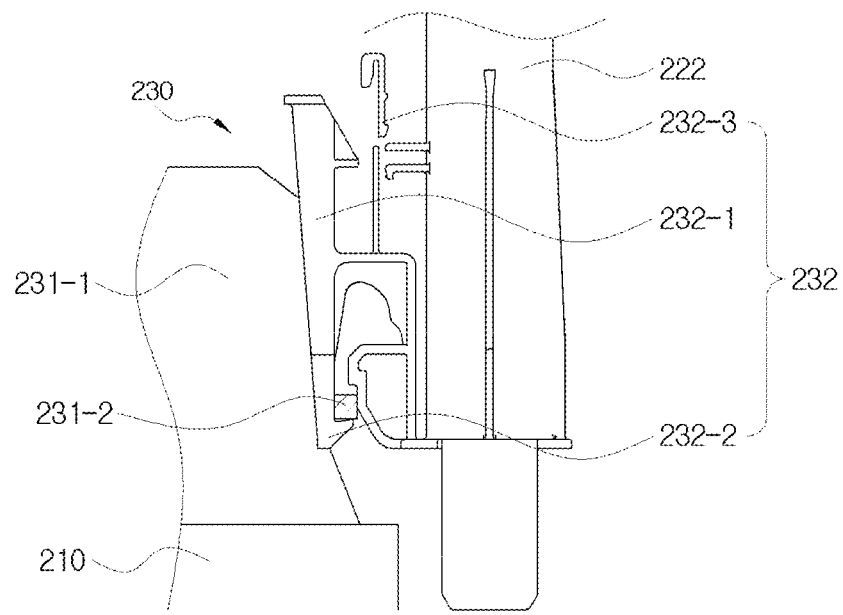
FIGS. 13(a) and 13(b) are views illustrating a fixing portion of a fuel tank for a vehicle according to the present invention.
Figure 13B:
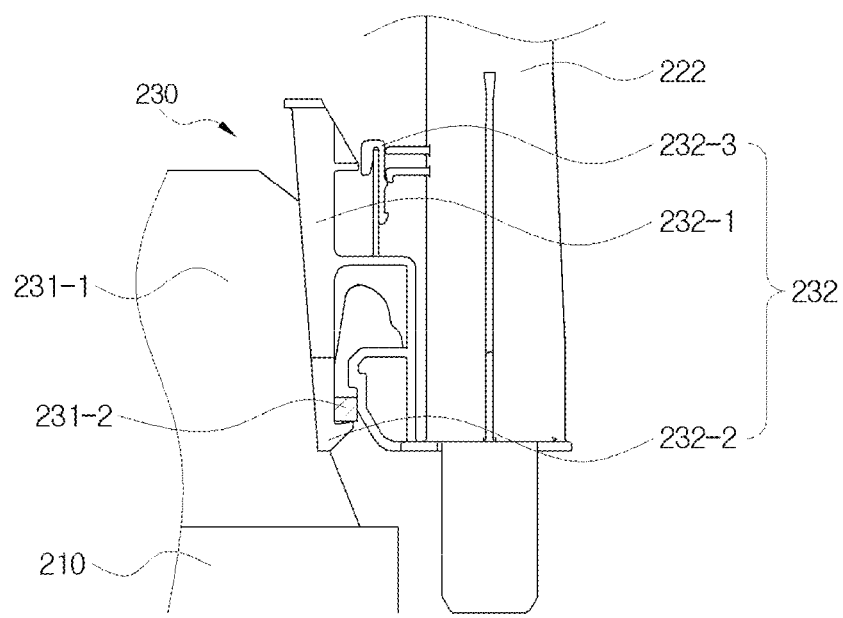

FIGS. 8(*a*) and 8(*b*) are views illustrating a fuel tank for a vehicle according to the present invention, FIG. 9 is a view illustrating a fuel supply unit according to the present invention, FIG. 10 is a view illustrating a first fuel measuring bar constituting a fule supplying unit of a fuel tank for a vehicle according to the present invention, FIG. 11 is a view illustrating a second fuel measuring bar constituting a fule supplying unit of a fuel tank for a vehicle according to the present invention, FIG. 12 is a view illustrating a fixing portion of a fuel measuring bar constituting a fuel supplying unit of a fuel tank for a vehicle according to the present invention, FIGS. 13(*a*) and 13(*b*) are views illustrating a fixing portion of a fuel tank for a vehicle according to the present invention.

The fuel tank for a vehicle is configured to mainly include a fuel storing body 100 in which a fuel for combustion of an engine is stored and a fuel supplying unit 200 supplying the fuel stored in the fuel storing body 100 to the engine, as illustrated in FIGS. 8(*a*) and 8(*b*).

The fuel storing body 100 includes a fuel supplier (not illustrated), and fuel is supplied from the fuel supplier and stored in the fuel storing body, and a shape of the fuel storing body 100 may be various depending on a size, a purpose, and the like, of the vehicle, and is thus not limited to that illustrated in the drawings.

In addition, the fuel storing body 100 may include a flange hole 110 formed therein so that the fuel supplying unit 200, or the like, may enter the fuel storing body 100 and exit from the fuel storing body 100, and the flange hole 100 may be formed in an upper portion of a side surface of the fuel storing body 100. However, the flange hole 110 is not limited thereto, but may also be formed in various positions.

The fuel supplying unit 200 is configured to mainly include a fuel pump 210 and a fuel measuring bar 220, and the fuel pump 210 may be provided in the fuel storing body 100 to supply the fuel to the engine through a fuel channel 211 connected to the engine.

The fuel measuring bar 220 is formed to measure a fuel amount stored in the fuel storing body 100 so as to allow the fuel pump 210 to supply the fuel by a selected fuel amount to the engine.

The fuel channel 211 of the fuel pump 210 may be fixed to a flange lid 120, or the like, and the flange lid 120 may be provided with the fuel channel 211 and a pressure sensor (not illustrated), or the like, and be fixed to the flange hole 110 to close the fuel storing body 100, thereby making it possible to prevent the fuel to be leaked to the outside.

However, the fuel pump, the fuel channel, the flange lid, and the like, are the well-known technology, and a detailed description therefor will thus be omitted.

The fuel measuring bar 220 may be formed in a vertical direction at one side of the fuel pump 210 in the fuel storing body 100, and may measure a fuel amount in the fuel storing body 100 using an ultrasonic wave formed at a lower end thereof.

Here, an object of the fuel tank for a vehicle according to the present invention is to provide the fuel measuring bar 220 of which decoupling for assembling and replacement is easily conducted through the flange hole 110 formed in the upper portion of the side surface of the fuel storing body 100. To this end, the fuel measuring bar 220 includes a first fuel measuring bar 221 and a second fuel measuring bar 222, and may be formed by coupling the first fuel measuring bar 221 and the second fuel measuring bar 222 to each other.

That is, the fuel measuring bar 220 is formed to be separated into the first fuel measuring bar 221 and the second fuel measuring bar 222 which each enter the fuel storing body 100, and the first fuel measuring bar 221 and the second fuel measuring bar 222 entering the fuel storing body 100 are coupled to each other in the fuel storing body 100.

The first fuel measuring bar 221 and the second fuel measuring bar 222 constituting the fuel measuring bar 220 will be described in more detail. The first fuel measuring bar 221 includes a first fuel measuring bar body 221-1 including a first fuel measuring path 221-2 formed to be hollowed, and an ultrasonic sensor unit 221-3 disposed at a lower end of the first fuel measuring bar body 221-1 and including an ultrasonic sensor (not illustrated).

Here, the ultrasonic sensor unit 221-3 is formed to be fixed to a bottom surface of the fuel storing body 100, thereby making it possible to fix the first fuel measuring bar 221 to the bottom surface of the fuel storing body 100.

Here, the ultrasonic sensor unit 221-3 means the ultrasonic sensor provided in the fuel tank for a vehicle depending on the system and the method for optimizing driving of an ultrasonic sensor according to an exemplary embodiment of the present invention.

The second fuel measuring bar 222 includes a second fuel measuring bar body 222-1 having a lower end formed to be coupled to an upper end of the first fuel measuring bar body 221-1 and including a second fuel measuring path 222-2 hollowed so as to be in communication with the first fuel measuring path 221-2 and forming a fuel measuring path 220-2 by coupling to the first fuel measuring path 221-2.

That is, in the fuel measuring bar 220, the first fuel measuring bar 221 is fixed to the bottom surface of the fuel storing body 100, and the fuel measuring path 220-2 is formed by the second fuel measuring bar 222 coupled to an upper end of the first fuel measuring bar 221, such that a fuel amount of the fuel positioned in the fuel measuring path 220-2 may be measured using the ultrasonic sensor of the ultrasonic sensor unit 221-3.

As described above, the fuel measuring bar 220 is formed by coupling the first fuel measuring bar 221 and the second fuel measuring bar 222 to each other, and a coupling configuration therefor will be described in more detail with reference to the drawings.

The first fuel measuring bar 221 includes a fitting portion 221-4 formed at the upper end of the first fuel measuring bar body 221-1 and including fitting grooves 221-4a formed in an outer peripheral surface of the first fuel measuring path 221-2.

The second fuel measuring bar 222 includes a sliding portion 222-4 formed at the lower end of the second fuel measuring bar body 222-1 and including sliding protrusions 222-4a formed on an outer peripheral surface of the second fuel measuring path 222-2 so as to be fitted into the fitting grooves 221-4a.

That is, the sliding protrusions 222-4a of the sliding portion 222-4 of the second fuel measuring bar 222 are formed to protrude from the second fuel measuring bar body 222-1 in a downward direction to be thus fitted into the fitting grooves 221-4a of the fitting portion 221-4.

Here, cross sections of the fitting grooves 221-4a of the fitting portion 221-4 and the sliding protrusions 222-4a fitted into the fitting grooves 221-4a have a circular shape, such that the sliding protrusions 222-4a may be fitted into the fitting grooves 221-4a.

However, it is preferable that two or more sliding protrusions 222-4a are formed at both sides of the sliding portion 222-4 in a horizontal direction so as to protrude in the downward direction, as illustrated in the drawings, in consideration of easiness of manufacturing and a manufacturing cost, and the fitting grooves 221-4a also have a shape corresponding to that of the sliding protrusions 222-4a.

This may make a manufacturing process easy, and prevent the sliding protrusions 222-4a from being not firmly fitted into the fitting grooves 221-4a by rotating the sliding protrusions 222-4a in the fitting grooves 221-4a.

As described above, the first fuel measuring bar 221 and the second fuel measuring bar 222 are coupled to each other to form the fuel measuring bar 220, and need to be easily decoupled from each other for the purpose of replacement after they are coupled and assembled to each other.

Therefore, it is preferable that the fuel measuring bar 220 is formed so that the first fuel measuring bar 221 and the second fuel measuring bar 222 may be coupled to each other only by fitting the sliding protrusions 222-4a of the second fuel measuring bar 222 into the fitting grooves 221-4a of the first fuel measuring bar 221, as described above.

However, the first fuel measuring bar 221 and the second fuel measuring bar 222 are easily coupled to and decoupled from each other, but it is difficult to maintain verticality of the first fuel measuring bar 221 and the second fuel measuring bar 222 in the vertical direction due to the fuel in the fuel storing body 100, such that it is difficult to accurately measure a fuel amount, and the first fuel measuring bar 221 and the second fuel measuring bar 222 are decoupled from each other due to external impact, or the like, such that it is difficult to appropriately perform a role such as measurement of the fuel amount, or the like.

Particularly, the first fuel measuring bar 221 is fixed to the fuel storing body 100, but the second fuel measuring bar 222 is coupled to the first fuel measuring bar 221 in only a level in which it is fitted into the first fuel measuring bar 221, such that there is a risk that the second fuel measuring bar 222 will be decoupled or separated.

The fuel supplying unit 200 of the fuel tank for a vehicle according to the present invention may further include a separate fixing portion 230 fixing the fuel measuring bar 220 to the fuel pump 210, in consideration of the problem described above.

The fixing portion 230 includes a fuel pump fixing portion 231 formed at one side of the fuel pump 210 facing the fuel measuring bar 220 and a fuel measuring bar fixing portion 232 formed at one side of the second fuel measuring bar 222 facing the fuel pump fixing portion 231 to be fixed to the fuel pump fixing portion 231.

That is, the fuel supplying unit 200 may fix the second fuel measuring bar 222 to the fuel pump 210 through the fixing portion 230 including the fuel pump fixing portion 231 formed at the fuel pump 210 and the fuel measuring bar fixing portion 232 formed at the second fuel measuring bar 222, and the fixing portion 230 may prevent movement and separation of the second fuel measuring bar 222.

In other words, the ultrasonic sensor unit 221-3 formed at a lower end of the first fuel measuring bar 221 is fixed to the bottom surface of the fuel storing body 100, and the second fuel measuring bar 222 is fixed to the fuel pump 210 through the fixing portion 230 formed at the fuel pump 210 and the second fuel measuring bar 222 so as to maintain verticality in the vertical direction and prevent the movement and the separation of the second fuel measuring bar 222 while being fitted into and coupled to the first fuel measuring bar 221.

The fixing portion 230 described above will be described in more detail. The fuel pump fixing portion 231 of the fixing portion 230 includes a guide path 231-1 formed in the vertical direction and a fixing jaw 231-2 formed at a lower side of the guide path 231-1 to protrude toward the fuel measuring bar 220.

The fuel measuring bar fixing portion 232 may be formed in a tongs shape including a tongs body 232-1 having a shape corresponding to that of the guide path 231-1 to be fitted into the guide path 231-1 and a fixing protrusion 232-2 formed at a lower distal end of the tongs body 231-1 and formed to be fixable to the fixing jaw 231-2.

That is, the fixing jaw 231-2 of the fuel pump fixing portion 231 may be formed to protrude toward the fuel measuring bar 220 and be formed to protrude in a state in which it is spaced apart from the guide path 231-1 to include a hollow through which the tongs body 232-1 may pass.

In this case, the tongs body 232-1 of the fuel measuring bar fixing portion 232 is fitted into the guide path 231-1 to move in the downward direction, a lower end of the tongs body 232-1 having a tongs shape is rotatably formed, and the fixing protrusion 232-2 is engaged with and fixed to the fixing jaw 231-2 by rotation, thereby making it possible to fix the second fuel measuring bar 222 to the fuel pump 210.

As described above, the fuel supplying unit 200 includes the fixing portion 230 formed in a tongs shape, thereby making it possible to easily fix the second fuel measuring bar 222 to the fuel pump 210 without separate fixing.

In this case, shaking or separation of the second fuel measuring bar 222 may be prevented to enable accurate measurement of the fuel in the fuel storing body 100 and reduce a manufacturing time required for assembling the fuel measuring bar 220.

In addition, when the second fuel measuring bar 222 is decoupled from the fuel pump 210 in order to replace the fuel measuring bar 220, the second fuel measuring bar 222 may be decoupled from the fuel pump by a simple decoupling operation of the fixing portion 230 formed in the tongs shape, and replacement is thus also easily performed.

In addition, the fuel measuring bar fixing portion 232 of the fixing portion 230 may further include a locking clip 232-3 formed to prevent the fuel measuring bar fixing portion 232 from being decoupled and separated from the fuel pump fixing portion 231 by rotation (in the case in which the tongs body 232-1 is not firmly fixed) of the tongs body 232-1 having the tongs shape after it is fixed to the fuel pump fixing portion 231.

The locking clip 232-2 is formed to be fitted and fixed between two portions of the tongs body 232-1 formed in the tongs shape to prevent rotation of the tongs bodies 232-1, thereby making it possible to prevent the separation from the fuel pump fixing portion 231 due to the tongs body 232-1.

In addition, it is preferable that the locking clip 232-3 is made of an elastic material, and it is preferable that the locking clip 232-3 may be easily fitted between the two portions of the tongs body 232-1 and prevent movement of the tongs body 232-1 by elasticity after it is filled between the two portions of the tongs body 232-1.

As described above, the fixing portion 230 may fix the second fuel measuring bar 222 to the fuel pump 210 to prevent the decoupling and the separation of the second fuel measuring bar 222.

However, a configuration and a shape of the fixing portion 230 formed in the tongs shape described above are only an example, and the fixing portion 230 is not limited thereto, but may have various configurations and shapes as long as it may easily fix the second fuel measuring bar 222 to the fuel pump 210 or may easily decouple the second fuel measuring bar 222 from the fuel pump 210.

<First Exemplary Embodiment of Fuel Measuring Bar>

Figure 14:
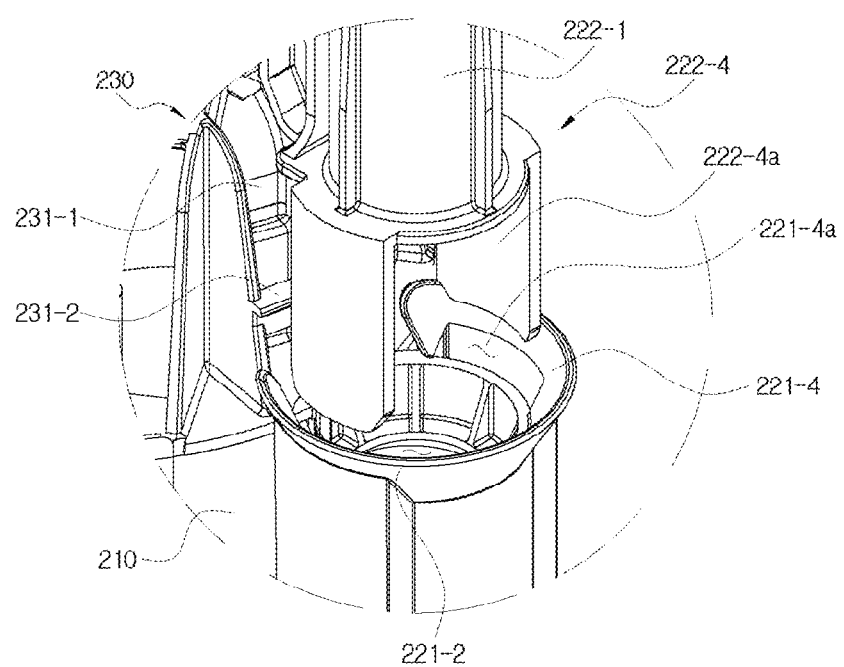
FIG. 14 is a view illustrating a fuel measuring bar constituting a fuel supplying unit of a fuel tank for a vehicle according to a first exemplary embodiment of the present invention.

FIG. 14 is a view illustrating a fuel measuring bar constituting a fuel supplying unit of a fuel tank for a vehicle according to a first exemplary embodiment of the present invention.

As illustrated in FIG. 14, the fitting portion 221-4 of the first fuel measuring bar 221 includes an elastic portion 221-4b formed on an inner peripheral surface of the fitting groove 221-4a and made of an elastic material.

The elastic portion 221-4b may be formed of a spring, or the like, made of an elastic material, the second fuel measuring bar 222 is fitted into and coupled to the fitting groove 221-4a and is fixed to the fuel pump 210, and at the same time, the second fuel measuring bar 222 applies force to the elastic portion 221-4b. Therefore, the elastic portion 221-4b applies force to the first fuel measuring bar 221 in the downward direction to firmly fix the first fuel measuring bar 221 to the fuel storing body 100.

In more detail, the first fuel measuring bar 221 may be fixed to the fuel storing body 100 by a fixing device such as a bracket, or the like, for the purpose of the future easy replacement work, and may be floated by a predetermined distance in an upward direction by the fuel stored in the fuel storing body 100.

It makes accurate measurement of the fuel amount by the ultrasonic sensor unit 221-3 difficult, and makes maintenance of the verticality of the first fuel measuring bar 221 in the vertical direction difficult.

Therefore, the elastic portion 221-4b applies the force to the first fuel measuring bar 221 in the downward direction, thereby making it possible to prevent the first fuel measuring bar 221 from being floated by the fuel.

<Second Exemplary Embodiment of Fuel Measuring Bar>

Figure 15:
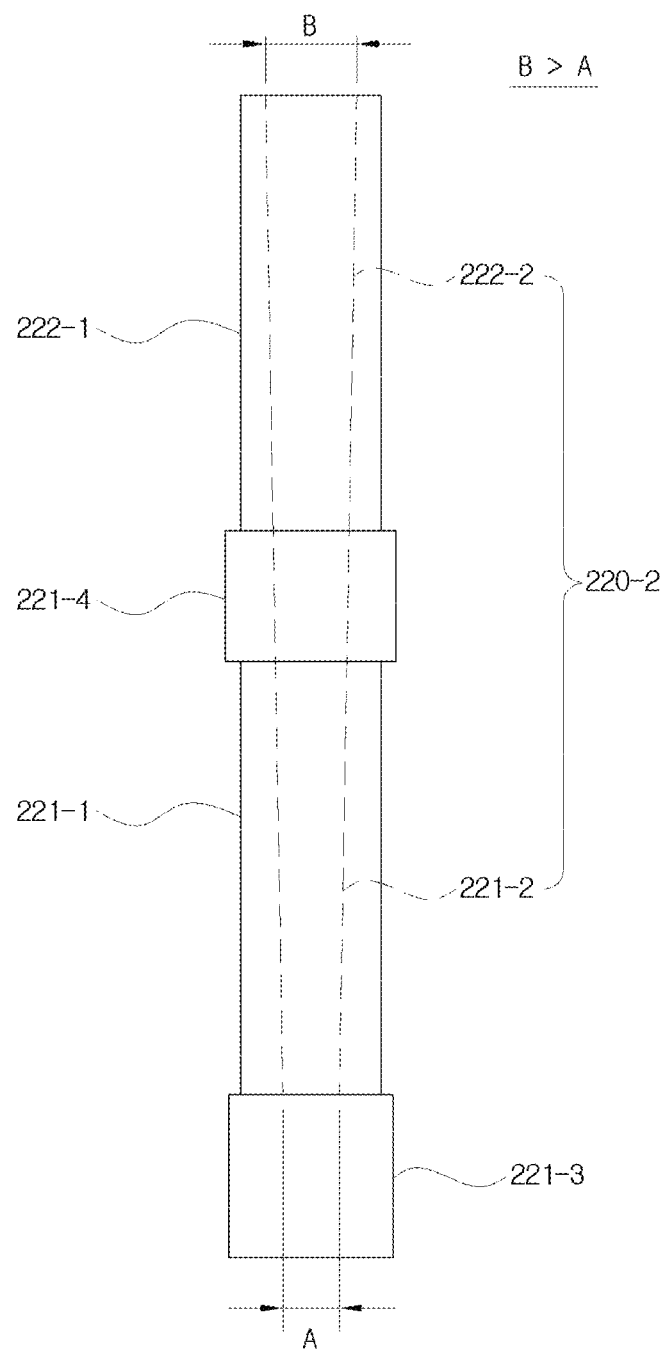
FIG. 15 is a view illustrating a fuel measuring bar constituting a fuel supplying unit of a fuel tank for a vehicle according to a second exemplary embodiment of the present invention.

FIG. 15 is a view illustrating a fuel measuring bar constituting a fuel supplying unit of a fuel tank for a vehicle according to a second exemplary embodiment of the present invention.

As illustrated in FIG. 15, the fuel measuring path 220-2 formed by coupling the first fuel measuring path 221-2 of the first fuel measuring bar 221 and the second fuel measuring path 222-2 of the second fuel measuring bar 222 may be formed to have a predetermined angle so that a diameter thereof in the horizontal direction becomes wide toward the upward direction.

That is, the ultrasonic sensor of the ultrasonic sensor unit 221-3 measures the fuel amount using an ultrasonic wave, and the ultrasonic wave linearly moves while being extended so that a diameter thereof in the horizontal direction becomes large.

In other words, when the fuel measuring path 220-2 through which the ultrasonic wave generated from the ultrasonic sensor moves is formed to have the same diameter, the ultrasonic wave linearly moves while being extended is reflected by a wall of the fuel measuring path 220-2, such that the fuel amount may not be accurately measured.

Therefore, the fuel measuring path 220-2 may be formed to have a diameter that is the same as or greater than a moving radius of the ultrasonic wave, and as described above, the fuel measuring path 220-2 is formed to have the predetermined angle so that the diameter thereof becomes wide toward the upward direction, thereby making it possible to prevent reflection of the ultrasonic wave.

As described above, it is preferable that the predetermined angle of the fuel measuring path 220-2 is the same as or slightly greater than a direction in which the ultrasonic wave moves while being diffused.

Figure 16:
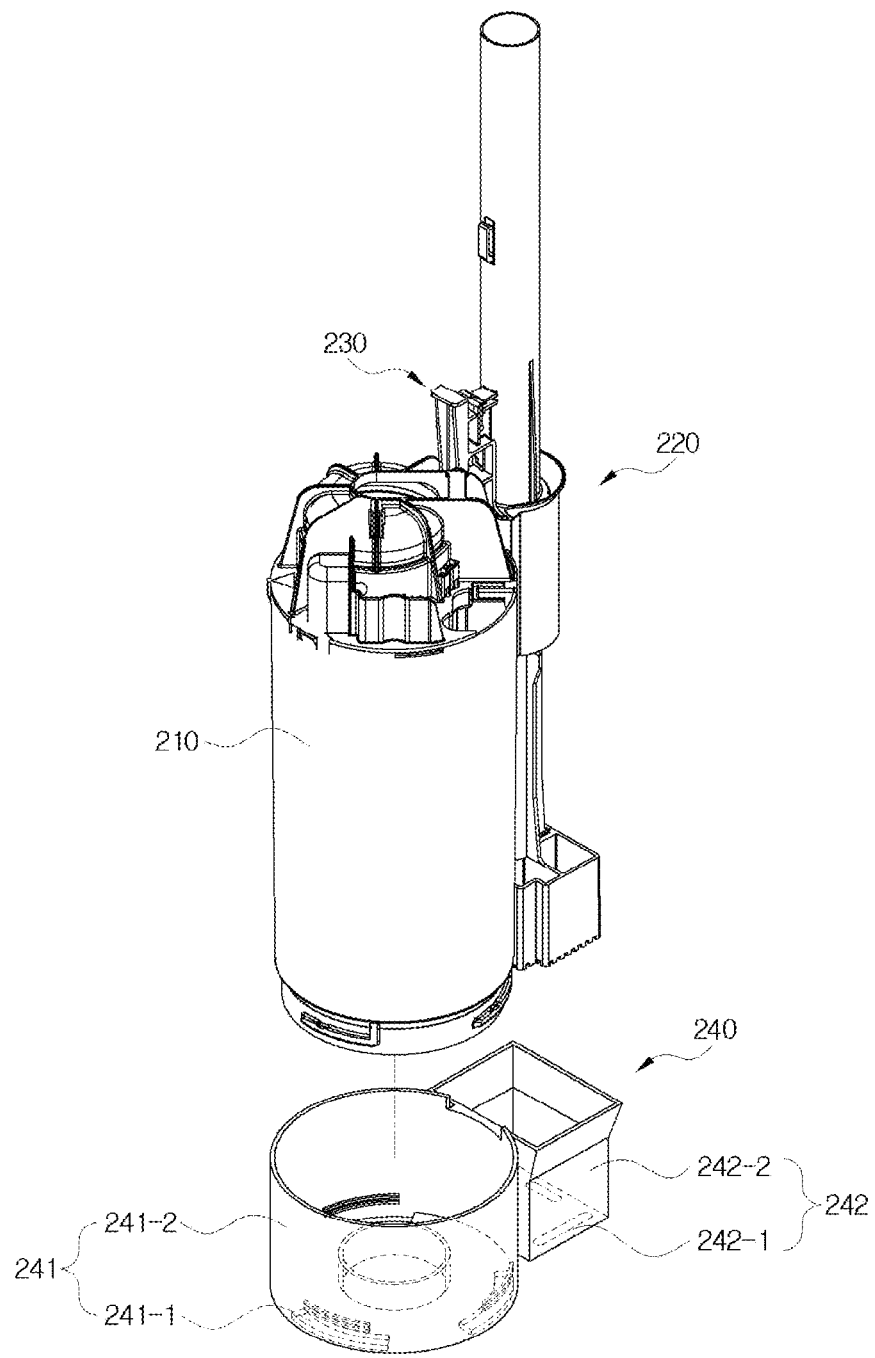
FIG. 16 is a view illustrating a bracket portion of a fuel tank for a vehicle according to the present invention.

FIG. 16 is a view illustrating a bracket portion of a fuel tank for a vehicle according to the present invention.

As illustrated in FIG. 16, the fuel supply unit 200 may further include a bracket portion 240 including a first bracket portion 241 including a first bracket 241-1 formed on the bottom surface of the fuel storing body 100 so that a lower end of the fuel pump 210 may be fixed thereto, and a second bracket portion 242 including a second bracket 242-1 formed on the bottom surface of the fuel storing body 100 so that a lower end of the ultrasonic sensor unit 221-3 may be fixed thereto.

The bracket portion 240 is formed to be fixed to the bottom surface of the fuel storing body 100, may easily fix the fuel pump 210 and the fuel measuring bar 220 using the first bracket 241-1 and the second bracket 242-1, and may facilitate decoupling depending on replacement by the fixing of the brackets.

Here, configurations and shapes of the first bracket 241-1 and the second bracket 242-1 are not limited to those illustrated in the drawing, but may be variously modified so that the first bracket 241-1 and the second bracket 242-1 may easily fix and decouple the fuel pump 210 and the fuel measuring bar 220.

In addition, the first bracket portion 241 and the second bracket portion 242 constituting the bracket portion 240 may include a first bracket auxiliary portion 241-2 and a second bracket auxiliary portion 242-2 formed in the upward direction, respectively.

Since the first bracket auxiliary portion 241-2 and the second bracket auxiliary portion 242-2 may serve as guide paths for fixing the fuel pump 210 and the fuel measuring bar 220 to the bracket portion 240, the fuel pump 210 and the fuel measuring bar 220 obliquely entering the fuel storing body 100 at a predetermined angle through the flange hole 110 may be accurately and easily fixed to the bracket portion 240.

In addition, the first bracket auxiliary portion 241-2 and the second bracket auxiliary portion 242-2 fix vertical positions of the fuel pump 210 and the fuel measuring bar 220 fixed to the first bracket 241-1 and the second bracket 242-1, respectively, thereby enabling a pumping operation of the fuel pump 210 and accurate measuring of the fuel amount by the fuel measuring bar 220, respectively.

It is preferable that the second bracket auxiliary portion 242-2 is formed in a penetration form so that the fuel may move to the fuel measuring path 220-2 in the fuel measuring bar 220.

The system and a method for optimizing driving of an ultrasonic sensor according to the present invention having the configuration as described above may accurately measure a liquid level in a fuel tank for a vehicle in a state in which a blind zone is minimized by controlling a driving state of the ultrasonic sensor in order to solve a problem that it is difficult to measure a level of a fuel existing in a blind zone overlapping a ringing time generated at the time of driving the ultrasonic sensor, in measuring the liquid level of the fuel tank for a vehicle using the ultrasonic sensor.

Particularly, the driving voltage of the ultrasonic sensor is controlled in real time depending on a current fuel height in the fuel tank, thereby making it possible to minimize the blind zone, and the pulse width or the number of pulses as well as the driving voltage is forcibly controlled to minimize the blind zone, thereby making it possible to accurately measure the liquid level in the fuel tank.

In addition, a plurality of liquid level TOFs are received using the ultrasonic sensor and a preset calculating process is performed to minimize a measuring error, thereby making it possible to accurately measure the liquid level in the fuel tank for a vehicle, and particularly, a measuring error of a scattered reflection or scattering phenomenon due to bubbles generated by a fuel boiled in the case in which the vehicle is positioned in a high temperature environment is effectively corrected, thereby making it possible to secure diversity of vehicles in which the fuel tank may be used.

The system and a method for optimizing driving of an ultrasonic sensor according to the present invention self-diagnose an error (a short or an open) of the ultrasonic sensor to inform the driver of the vehicle of accuracy for current liquid level information of the fuel tank, thereby making it possible to improve reliability of a measured liquid level value.

In addition, the liquid level TOFs are analyzed to decide a temporary measuring error due to inclination as well as the measuring error due to the bubbles or decide the necessity to supply the fuel, thereby making it possible to accurately perform measurement.

Finally, the ultrasonic sensor is provided on the inner bottom surface of the fuel tank, such that the ultrasonic sensor is exposed to air, thereby making it possible to minimize an error of the ultrasonic sensor itself due to the exposure.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A system for optimizing driving of an ultrasonic sensor, comprising:
    an ultrasonic sensor unit provided on an inner bottom surface of a fuel tank for a vehicle and generating a time of flight (TOF) by transmitting and receiving an ultrasonic signal for calculating a distance from the inner bottom surface of the fuel tank to a fuel surface; and
    a central processing unit calculating liquid level information of the fuel tank using the TOF transferred from the ultrasonic sensor unit and controlling a driving voltage of the ultrasonic sensor unit using the liquid level information,
    wherein the central processing unit controls the driving voltage to be a minimum value of an allowable driving voltage of the ultrasonic sensor unit in the case in which the calculated liquid level information of the fuel tank is a preset minimum fuel amount value or less, and controls the driving voltage to be a maximum value of the allowable driving voltage of the ultrasonic sensor unit in the case in which the calculated liquid level information of the fuel tank exceeds the preset minimum fuel amount value.

2. The system for optimizing driving of an ultrasonic sensor of claim 1, wherein the central processing unit forcibly controls a pulse width of the ultrasonic sensor unit in the case in which the calculated liquid level information of the fuel tank exceeds the preset minimum fuel amount value, primarily forcibly controls the number of pulses of the ultrasonic sensor unit in the case in which the calculated liquid level information of the fuel tank exceeds the preset minimum fuel amount value and is a preset maximum fuel amount value or less, and secondarily forcibly controls the number of pulses of the ultrasonic sensor unit in the case in which the calculated liquid level information of the fuel tank exceeds the preset minimum fuel amount value and exceeds the preset maximum fuel amount value.

3. The system for optimizing driving of an ultrasonic sensor of claim 1, further comprising a display unit outputting the liquid level information of the fuel tank transferred from the central processing unit so that a driver of the vehicle confirms the liquid level information.

4. A method for optimizing driving of an ultrasonic sensor including an ultrasonic sensor unit provided on an inner bottom surface of the fuel tank, obtaining a TOF for calculating a distance from the inner bottom surface of the fuel tank to a fuel surface, and transmitting the TOF, comprising:
    a receiving step in which a central processing unit receives a plurality of TOFs transferred from the ultrasonic sensor unit by a preset number of times for a preset time;
    an arranging step in which the central processing unit calculates a plurality of initial liquid level information using the plurality of TOFs transferred in the receiving step and arranges the plurality of initial liquid level information in an ascending order or a descending order;
    a correcting step in which the central processing unit excludes initial liquid level information corresponding to a preset reference value or less or initial liquid level information corresponding to 0 among the plurality of initial liquid level information that is arranged in the arranging step;
    a liquid level measuring step in which the central processing unit calculates final liquid level information using the initial liquid level information remaining after excluding the initial liquid level information in the correcting step; and
    an ultrasonic driving control step in which the central processing unit controls a driving voltage of the ultrasonic sensor unit using the final liquid level information calculated in the liquid level measuring step,
    wherein after the ultrasonic driving control step is performed, the receiving step, the arranging step, the correcting step, the liquid level measuring step, and the ultrasonic driving control step are repeatedly performed using the controlled driving voltage of the ultrasonic sensor unit.

5. The method for optimizing driving of an ultrasonic sensor of claim 4, wherein the central processing unit controls the driving voltage to be a minimum value of an allowable driving voltage of the ultrasonic sensor unit in the case in which the calculated final liquid level information is a preset minimum fuel amount value or less, and controls the driving voltage to be a maximum value of the allowable driving voltage of the ultrasonic sensor unit in the case in which the calculated final liquid level information exceeds the preset minimum fuel amount value.

6. The method for optimizing driving of an ultrasonic sensor of claim 4, further comprising a displaying step of transferring the calculated final liquid level information to a display unit and displaying the calculated final liquid level information.

7. A method for optimizing driving of an ultrasonic sensor including an ultrasonic sensor unit provided on an inner bottom surface of the fuel tank, obtaining a TOF for calculating a distance from the inner bottom surface of the fuel tank to a fuel surface, and transmitting the TOF, comprising:
    a receiving step in which a central processing unit receives a plurality of TOFs transferred from the ultrasonic sensor unit by a preset number of times for a preset time;
    a correcting step in which the central processing unit calculates a plurality of initial liquid level information using the plurality of TOFs transferred in the receiving step and excludes initial liquid level information corresponding to a preset reference value or less or initial liquid level information corresponding to 0 among the plurality of initial liquid level information;
    an arranging step in which the central processing unit arranges the initial liquid level information remaining after excluding the initial liquid level information in the correcting step in an ascending order or a descending order;
    a liquid level measuring step in which the central processing unit calculates final liquid level information using the initial liquid level information arranged in the arranging step; and
    an ultrasonic driving control step in which the central processing unit controls a driving voltage of the ultrasonic sensor unit using the final liquid level information calculated in the liquid level measuring step,
    wherein after the ultrasonic driving control step is performed, the receiving step, the correcting step, the arranging step, the liquid level measuring step, and the ultrasonic driving control step are repeatedly performed using the controlled driving voltage of the ultrasonic sensor unit.

8. The method for optimizing driving of an ultrasonic sensor of claim 7, wherein the central processing unit controls the driving voltage to be a minimum value of an allowable driving voltage of the ultrasonic sensor unit in the case in which the calculated final liquid level information is a preset minimum fuel amount value or less, and controls the driving voltage to be a maximum value of the allowable driving voltage of the ultrasonic sensor unit in the case in which the calculated final liquid level information exceeds the preset minimum fuel amount value.

9. The method for optimizing driving of an ultrasonic sensor of claim 7, further comprising a displaying step of transferring the calculated final liquid level information to a display unit and displaying the calculated final liquid level information.

\* \* \* \* \*